(12) United States Patent
Cohen et al.

(10) Patent No.: US 7,613,929 B2
(45) Date of Patent: Nov. 3, 2009

(54) METHOD AND SYSTEM FOR BIOMETRIC IDENTIFICATION AND AUTHENTICATION HAVING AN EXCEPTION MODE

(75) Inventors: Mark Sherman Cohen, Boca Raton, FL (US); Shailesh Chirputkar, Green Brook, NJ (US); Scott Stanley Allan Coby, Stamford, CT (US)

(73) Assignee: Triad Biometrics, LLC, Stamford, CT (US)

( * ) Notice: Subject to any disclaimer, the term of this patent is extended or adjusted under 35 U.S.C. 154(b) by 803 days.

(21) Appl. No.: 11/280,219

(22) Filed: Nov. 17, 2005

(65) Prior Publication Data

US 2006/0112279 A1    May 25, 2006

Related U.S. Application Data

(60) Provisional application No. 60/629,295, filed on Nov. 19, 2004.

(51) Int. Cl.
*G06F 21/00* (2006.01)
(52) U.S. Cl. ....................................... 713/186
(58) Field of Classification Search ................. 713/186
See application file for complete search history.

(56) References Cited

U.S. PATENT DOCUMENTS

| | | | |
|---|---|---|---|
| 6,341,290 B1 * | 1/2002 | Lombardo et al. | 707/104.1 |
| 6,449,651 B1 * | 9/2002 | Dorfman et al. | 709/229 |
| 6,607,136 B1 | 8/2003 | Atsmon et al. | |
| 7,117,356 B2 | 10/2006 | LaCous | |
| 2002/0091645 A1 | 7/2002 | Tohyama | |
| 2003/0046589 A1 | 3/2003 | Gregg | |
| 2004/0103324 A1 * | 5/2004 | Band | 713/202 |

FOREIGN PATENT DOCUMENTS

| EP | 0 715 246 A | 6/1996 |
|---|---|---|
| EP | 0 715 246 A1 | 6/1996 |
| EP | 1 071 253 A | 1/2001 |

OTHER PUBLICATIONS

International Search Report PCT/US2005/041687.
International Preliminary Report on Patentability PCT/US2005/041687.
Partial International Search Report in counterpart foreign application PCT/US2005/041687, dated Apr. 6, 2006.
Office Action for U.S. Appl. No. 11/280,205 dated Apr. 8, 2009.

* cited by examiner

*Primary Examiner*—Gilberto Barron, Jr.
*Assistant Examiner*—Cordelia Kane
(74) *Attorney, Agent, or Firm*—Pearl Cohen Zedek Latzer, LLP

(57) ABSTRACT

Embodiments of the invention provide methods and systems for authenticating an enrolled user of a biometric authentication and/or identification system having an exception mode, in which the enrolled user submits a temporary password during authentication. The temporary password is only generated if the enrolled user's identity is verified and the person authorizing a change to the exception mode submits a valid biometric identifier.

10 Claims, 17 Drawing Sheets

FIGURE 4

Customer Application Login Page

UserID: _____

Login Method: [Choose One ▼]
* Fingerprint
* Password
* SafeWord
* SecurID

Password: (disabled if Fingerprint selected)

[Submit]

AC = Authentication Code
TP = Temporary Password
UECV = User Exception Counter Value

METHOD AND SYSTEM FOR BIOMETRIC IDENTIFICATION AND AUTHENTICATION HAVING AN EXCEPTION MODE

CROSS-REFERENCE TO RELATED APPLICATIONS

This application claims priority from U.S. Provisional Patent Application Ser. No. 60/629,295, filed on Nov. 19, 2004.

FIELD OF THE INVENTION

This invention relates to the fields of biometrics, authentication/identification, secure communication, and data management.

BACKGROUND OF THE INVENTION

The growth of the Internet and other networking technologies has enabled users of business and consumer applications to access these applications remotely at an ever increasing rate. To maintain the privacy of sensitive information and to avoid commercial losses from fraudulent access to these applications as well as to meet mandated government legislation, there is a need for accurate verification of a user's identity in a way that can not be imitated or stolen. Additionally, applications such as secure facility entry, banking transactions, and other commercial transactions would benefit greatly by irrefutable biometric authentication and/or identification.

Email services would also benefit from a more secure means of authentication. Whether accessed through a local network or over the Internet, the vast majority of email servers today rely on simple password authentication and are, therefore, highly vulnerable to fraudulent access.

Current means to prevent unauthorized access include password authentication, personal identification numbers (PINs), confirmation of various aspects of personal history (date of birth, mother's maiden name, etc.), hardware and/or software token-based access, combinations of password and token-based access, and trusted containers of secret SKI (Symmetric Key Infrastructure) keys or PKI (Public Key Infrastructure) key-pairs assigned to users, such as with smart cards, which may or may not be PIN-protected.

Password and PIN based authentication are two commonly used methods for a number of applications in commercial transactions. A password or PIN can be made nominally more secure by increasing its length, forcing the user to change it frequently, and/or imposing cryptic restrictions on it. However, these complications make access more difficult because of the challenge for users to remember such passwords or PINs, leading to an increased incidence of input errors. A mole serious drawback to both is that they can be easily stolen by direct or indirect observation of a user's input or his written record of both in an accessible location, cracked through the means of brute-force combinatorial or other cracker software, or intercepted in transit to a server and potentially replayed, if not sufficiently encrypted. Recently, fraudulent emails that appear as requests for information from commercial entities such as banks have been employed to induce consumers to disclose passwords or other personal information in a process known as phishing.

The requirement for disclosing personal information to gain access can partially enhance security. However, much of this information can also be obtained either fraudulently or through legal means from consumer database services as witnessed by recent intrusions into Checkpoint, HSBC, and others.

Token-based systems involve the use of a unique hardware or software token for authentication This token can range from a bank ATM card to various hardware devices that may or may not attach to a computer for authorizing access over a network to resident software for remote network users. These devices are often used in combination with a password or other personal identifier. Although token-based access is more difficult to reproduce fraudulently because access is granted only with the unique token, it still has a number of shortcomings. Highly portable tokens such as credit cards can be lost, stolen, and, in some cases, counterfeited. More sophisticated tokens, which generate either single-use or time-sensitive dynamic passwords, may be portable; however, they cannot be shared among different users without compromising their security. Furthermore, most such tokens have a limited lifespan before they require replacement or reactivation Lastly, any of these tokens can still be used for unintended access if an unauthorized user obtains the token and associated password, PIN, etc.

More recently, systems that employ images of a user's unique biometric identifiers such as fingerprints, hand geometry, retinal patterns, DNA, iris and facial scans have been used to eliminate some of these shortcomings. Biometric identifiers have the natural advantage of being unique to the individual being identified and can't be lost or stolen. With biometric authentication, an authorized user requests access using a scanner or similar device to capture an image of the biometric identifier. Depending on the algorithms employed, key features of the digital template derived from the grayscale image produced by the device ate compared to a database containing digital templates of authorized users. The matching system must be able to compare properly the sample template against a database of stored (enrolled) user templates, and identify the closest match within preset parameters. The two templates will not exactly match (as in contrast to password matching), because the user will not be generating the exact same image twice. A positive match occurs when the differences between the sample template and the closest stored template are less than predetermined thresholds. In this case, the user gains access to the system of application as appropriate. Accurate evaluation of the template is essential for mission critical applications in an enterprise environment. Any significant amount of false positives could have dire consequences for a business's viability, while false negatives can degrade the credibility of the authentication system. Furthermore, broad user acceptance of biometric authentication is contingent on this accuracy. Consequently, a highly-discriminating, advanced matching system, with accuracy far beyond current standards such as the Automatic Fingerprint Identification Systems (AFIS) used in law enforcement today for identification is needed in this type of environment.

Another challenge is to eliminate the risk of unauthorized copying and/or replaying of the response stream generated by a user's biometric output from a scanner. As a specific example, if the output of the biometric imaging of a fingerprint or extracted template thereof were recorded, that output could conceivably be played back at a later time as a means of attack into the system to gain unauthorized access. Thus, the problem becomes one of assuring that the image sample being submitted to the authentication system is being taken live, and the template extracted from the live image is not being replayed.

The vulnerability of the Internet and other public access networks to attack creates additional challenges for insuring secure authentication for remote access to applications and systems, including email. In one representative architecture, a user at a workstation requests access to an application. That request is encrypted and transmitted over a network to a web server where the authentication of the user takes place. If the user's identity is confirmed, the user accesses an application server behind an enterprise firewall. The direct exposure of the web server to the Internet leaves it vulnerable to hacking, cracking, SQL injection, and other methods for gaining unauthorized access to any or all applications and or their private data residing behind the enterprise firewall.

One alternative is to perform user-authentication at the application server level. User authentication at the application server level provides an added measure of security as opposed to the web server level because of the application server's more restricted access. Because of the diverse set of hardware and software components that are utilized in an enterprise, many applications are developed in the Java programming language because of its portability to a variety of operating systems. The biometric system should support the Java runtime environment as well as non-Java runtime environments that enable web application access including Microsoft's Net, ADODB and others that may come into mainstream computing use. Numerous commercially available application server technologies based on Java such as IBM WebSphere, BEA WebLogic, Macromedia JRun, and JBOSS support authentication directly with lightweight directory access protocol (LDAP) directories containing the user profile data and are compatible with the diversity of hardware and software in the enterprise. These directory servers can work with token-based authentication systems, dynamic passwords, and others as available depending on the authentication method supported. However, they don't eliminate the fundamental security problem with all of these authentication methods, namely that they all use credentials that can be shared, stolen or lost.

Although a number of authentication systems today allow for so-called site licenses with a fixed set of users, they seldom actually monitor and/or offer a variable maximum number of users, nor do they distinguish between classes of users for access or the number of applications using any particular authentication method. Licensing use by specific application and variable number of users would allow improved cost accounting fox enterprise software managers by creating a means for attributing licensing costs directly to each application In addition, the authentication software vendor can collect fees based on the incremental number of applications and/or users licensed, rather than strictly by site or maximum number of users. Charging for applications on an incremental basis is beneficial to enterprises because it allows them to purchase only what they need and not pay fox greater capacity which they do not utilize. It also facilitates cost accounting among various divisions and departments thereby giving greater autonomy to division and department managers by controlling and limiting expenditures.

SUMMARY OF THE INVENTION

The above-identified problems ate solved and technical advances are achieved by embodiments of the present invention.

The present inventors have determined that a biometric authentication and/or identification system should also solve several key implementation challenges First, a biometric system should be able to accommodate migration from one or mote existing authentication and/or identification system(s) without risk to the enterprise in terms of down time, cost, and security. The transition should include a user-friendly, accurate enrollment system that can detect and eliminate any attempt to create multiple user identities for any person or biometric identifier. This enrollment system should also accommodate multiple imaging devices types for generating reference images. In addition, the system should have a secure means for authenticating when a biometric imaging device is temporarily unavailable. This mode of operation, known as an exception mode, should be integrated within the system and include safeguards against tampering, attacks, and/or other types of compromise.

Some embodiments of the invention provide an integrated biometric authentication/identification and migration system with server side authentication and identification through the use of a four-tier architecture on a multi-platform, imaging-device-independent and imaging-device-interoperable structure Although the exemplary embodiments herein provide a biometric identification system that may be used in authentication, it is to be under stood that authentication may be provided alone without departing from the scope of the present invention.

Exemplary embodiments of 'some aspects of the invention include a method and apparatus for producing a biometric identification reference image based on selecting the image having the highest quality score from images received from two or more different imaging devices, alias-free enrollment on a work station containing one or more fingerprint imaging systems that includes server-based one-to-many alias checking, secure transmission of live biometric samples, a method and system for protecting access to licensed applications, a method and system for secure transmission of biometric data by time-stamping the data, web-based authentication testing resident on either a web server or a combination of web and application servers, a unique identities database in a secure facility, an in-house license generator for multiple user levels and applications that responds directly to client requests, a method and system for exception mode authentication with system operator biometric authorization, and a method and system for biometric authentication of user feedback.

The term "image" in the context of this application may refer to but is not limited to a representation or likeness of a biometric identifier that captures sufficient details of or data regarding the biometric identifier so as to uniquely identify the person from which the image was taken. Examples of images may include visual representations such as those of fingerprints, retinal patterns, hand geometry, and facial geometry, as well as non-visual representations such as those of voice pattern and DNA or any other biometric identifies as are known in the art. Moreover, imagers may employ a variety of imaging technologies to obtain images including but not limited to optical, infra-red, RF electronic, mechanical force measurement, temperature measurement, ultrasound, audio recording, active capacitance sensing and others as are known in the art.

Other and further aspects of the present invention will become apparent from the following detailed description of demonstrative embodiments of the invention and by reference to the attached drawings.

BRIEF DESCRIPTION OF THE DRAWINGS

FIG. 4 is a schematic illustration of a user login screen for an enterprise user web portal according to some demonstrative embodiments of the invention.

DETAILED DESCRIPTION OF THE PREFERRED EMBODIMENTS

Figure 1:
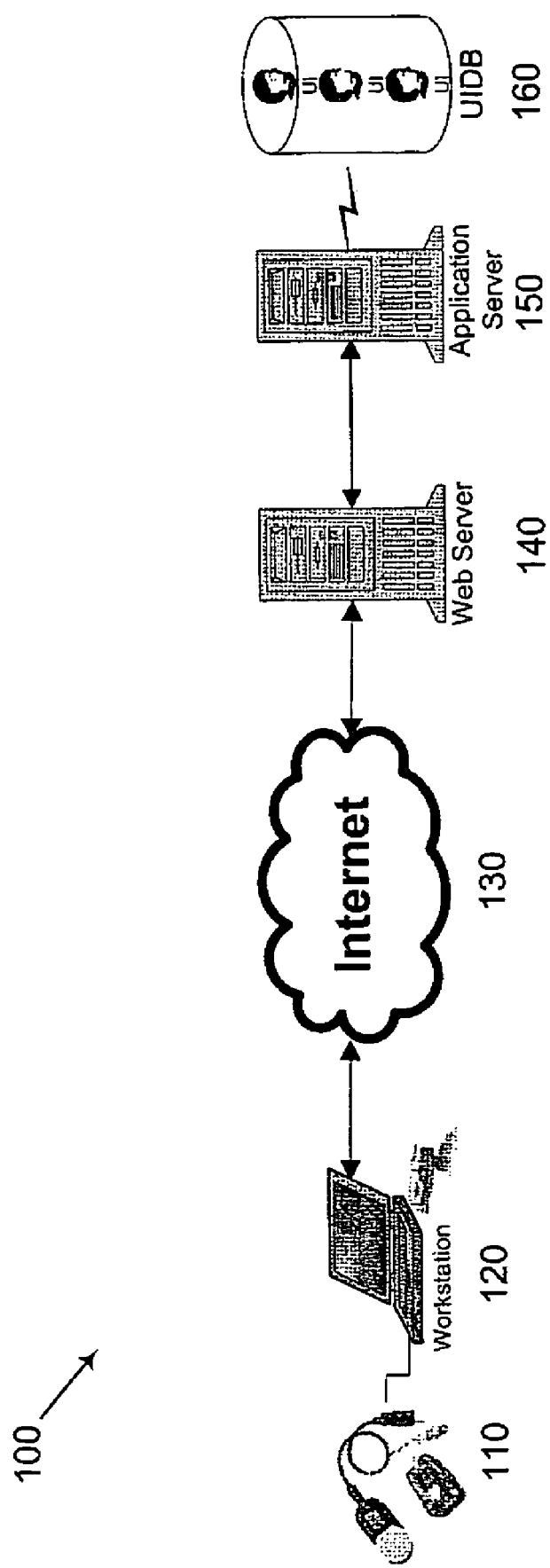
FIG. 1 is a schematic illustration of an authentication and identification system in a network environment according to some demonstrative embodiments of the present invention.

Methods and systems according to embodiments of the present invention relate to an integrated biometric authentication/identification and migration system with server side authentication and identification through the use of a four-tier architecture on a multi-platform, device-independent and device-interoperable structure. This architecture and novel aspects of the present invention provide an accurate, easy-to-use enrollment system and reduce the vulnerability of enterprise applications to access from unauthorized users without materially changing legacy hardware and software. Although a portion of the software for use with the present invention, as described herein, is written in the Java™ programming language, e g., to enhance its portability and interoperability, other programming languages may be used without departing from the spirit of the present invention. Furthermore, it is to be understood that in the demonstrative embodiments described herein, the use of 'software and hardware is not limited to the specific combinations discussed. It is possible that some or all software may be implemented as dedicated hardware, erg., as Application Specific Integrated Circuits (ASICs) of that some hardware may be implemented as software, e.g. as virtual machines, with departing from the scope of the present invention. It is also to be understood that any references to a biometric authentication system in the following discussion may also refer to a biometric identification system without departing from the scope of the present invention.

The following discussion and accompanying drawings present illustrative embodiments of the present invention. It is to be understood that other embodiments may be employed for protecting enterprise applications and for other uses without departing from the scope of the present invention. To overcome challenges faced by the current state of the art, as will become apparent from the descriptions below, the Enterprise Authentication and Migration System ("EAMS") according to some embodiments of the invention may include a number of key features:

Ease of enrollment
Inherent safeguards against unauthorized aliases
Multiple input devices
Input device interoperability
Accurate identification
Improved security An enterprise user's first experience with a new biometric authentication system may be for enrollment. Because most enterprise users have no experience with these systems, an easy enrollment process for the EAMS accelerates acceptance and helps to overcome any general concerns associated with the change. At the same time, inherent safeguards against potential unauthorized aliases assure that the EAMS can't be spoofed or tricked into inadvertently granting duplicate or unauthorized rights to unapproved individuals. The EAMS system must be compatible with multiple input devices for three primary reasons. First, by accommodating the diversity of existing biometric imaging products hardware, the EAMS enables enterprise customers to select from a wide variety of input device choices. Secondly, supporting multiple input devices during enrollment enables a higher degree of image fidelity with mote accurate results during subsequent authentication. For example, in fingerprint imaging, the imager that provides the best image quality for any given finger may be used to enroll that fingerprint. Lastly, allowing multiple input devices frees the user from being tied to a particular input device or brand of device and gives the EAMS more flexibility for accommodating changes in the devices used for authentication over time as new devices enter the market.

Accuracy and security are of paramount importance to the practical viability of an authentication system. The EAMS uniquely addresses security concerns with the following attributes: anti-replay, secure exception mode, alias-free enrollment, secure feedback system, and tamper-evident activity logs (by virtue of the DBMS employed).

FIG. 1 schematically illustrates an overview of an authentication and identification system 100 in a network environment. A user side of system 100 may include a biometric imager 110 and a workstation 120, which may communicate via a network 130, e.g., the Internet or an Intranet, with a web server 140 associated with an application server 150 and a unique identities database 160. Some embodiments of the invention may be implemented with multiple web servers and/or multiple application servers. In the network configuration of FIG. 1, a remote user at workstation 120 may be able to use system 100 to gain remote access to an application on application server 150. For this discussion, it is assumed that the user has been enrolled in the biometric authentication system prior to attempting access to the EAMS-enabled enterprise application.

Biometric imager 110 may be any of a number of biometric devices that scans and produces an image, e.g., grayscale image, of a user's physical attribute such as fingerprint, retinal pattern, iris, facial geometry, voice and/or any other desired attribute, and encodes that image for subsequent evaluation. There are a number of such imagers commercially available including STMicroelectronic's TouchChip fingerprint imager, CrossMatch's Verifier 300 LC fingerprint imager, AuthenTec's fingerprint imagers, and LG's iris access system. Although fingerprint imaging is used primarily throughout the subsequent discussion, any devices that scan the above-mentioned attributes as well as others can be used without departing from the spirit and capability of the present invention.

Biometric imager 110 may be connected to Workstation 120 using any suitable connector as is known in the art. Workstation 120 may include any remote computing device such as a laptop, desktop, or computer terminal with network access. The presently described EAMS is interoperable with a variety of systems; consequently, no specific operating system for workstation 120 is implied or required, but any support is limited to device drivers available from the manufacturer. The link between biometric imager 110 and workstation 120 can be via a variety of connections including USB, Serial, Compact Flash, or potentially as a part of an integrated fingerprint imager such as that commercially available on select notebook computers from IBM (T42), Samsung (P10, P30, T10), MPC Transport (T3000, X3000), and Gateway (450), as well as integrated in select keyboards from Cherry, KSI, and others Remote users may communicate with the enterprise via a public IP network, e.g. Internet 130, a private IP network, e g an Intranet, or other public or private networking technology such as broadband or dialup modem over the public switched telephone network. The physical link between remote user and enterprise can be over a variety of mediums as well, such as optical fiber, cable, satellite, of terrestrial wireless network.

Web server 140 may act as the gateway between Internet 130 and a corporate internal network represented in FIG. 1 by webserver 140, application server 150, and UIDB 160. In its simplest form, web server 140 is a computer with server software that supplies HTML content to a user's web browser using hypertext transfer protocol (HTTP) across a network such as Internet 130 via TCP ports 80 or 443. A number of commercial vendors offer software platforms to develop web server applications including, for example, Apache and Microsoft As the frontline of defense for an enterprise, web server 140 may directly or indirectly access data residing behind a firewall (not shown) that protects the enterprise data, users, and applications from tampering. When a user request for access to an application is received, web server 140 forwards the user request to a desired application on application server 150 and passes responses back to the user.

Application server 150 may be implemented as a standalone resource or in the form of a server program (middleware) that manages user sessions between web servers and an application program. As is known in the art, application servers may be used for banking and other financial transactions, database querying, and numerous other corporate programs Because of the diverse operating systems, hardware platforms, and programming languages for the applications and corporate settings, it is desirable to build application servers using an interoperable platform such as the Java 2, Enterprise Edition (J2EE) Platform. Although other run-time platforms such as, for example Miciosoft® ".Net" may be used without departing from the spirit of the present invention, subsequent discussion assumes the server based software has been built using J2EE because of its current prevalence in industry. There are a number of vendors for application servers that implement J2EE including WebSphere by IBM, WebLogic by BEA, JRun by Macromedia, BOSS by JBOSS Computing, and TOMCAT by Apache.org.

A large enterprise may require many application servers to meet its demand for the variety of programs accessible to its userbase. These application servers, in turn, may be accessible through a variety of portals such as web server 140 Although the following discussion refers to only a single web server 140 and a single application server 150 for the sake of brevity, it will be appreciated that the present invention contemplates access by a number of web servers as well as accommodating authentication for a variety of application servers. Representative embodiments for those configurations are presented below.

Furthermore, although this discussion separates web server and application server functions, there are numerous instances where the functions of web server and application server are combined on a single server, which may run on a dedicated physical computer or may be configured within a virtual machine using virtual infrastructure software such as, for example, VMWare's ESX Server. The EAMS may operate with appropriate changes in any of these architectures.

Unique Identities Database (UIDB) 160 may be a relational database and may store text, photographic, and biometric records of all authorized users including exception mode passwords and other key characteristics pertaining to each individual user. As in relational databases of conventional systems, UIDB 160 may be built on a DB2, Sybase, Oracle, MS-SQL and/or any other commercially available platform. The database interaction portion of the EAMS software may be platform independent, and may be designed to work with any of these platforms.

UIDB 160 may be housed in a high security facility to protect the sensitive nature of the information. A large enterprise may implement a variety of measures to protect these records, such as data parsing, failover/disk fault tolerance, server redundancy, mirroring, offline backups, and disaster recovery planning/testing.

The EAMS architecture according to some embodiments of the invention may include the following four tiers:

Tier 1—End User/Enrollment Operations
Tier 2—Applications
Tier 3—Administration and Alias Resolution
Tier 4—Collection, Matching, and Database The various elements of each of these tiers will be discussed throughout the following sections, but a brief functional overview of the architecture is given here. It should be apparent to one skilled in the art that the present invention may be employed in alternative architectures for an EAMS without departing from the spirit of the invention.

The Tier 1 elements are the front end applications and devices for the EAMS. They may be used during user enrollment and for biometric image data collection during authentication and identification. Tier 2 elements are various software and/or hardware components within the enterprise side of the system that may be used to perform desired functions during the authentication process. These elements may include servlets and methods implementing different authentication execution modes for EAMS-enabled applications. The Tier 3 elements are those related to system administrative as well as alias resolution functions. For example, the Collection, Matching, and Database software of Tier 4 performs the detailed functions of fingerprint comparison and matching against the database of unique identities.

Figure 2:
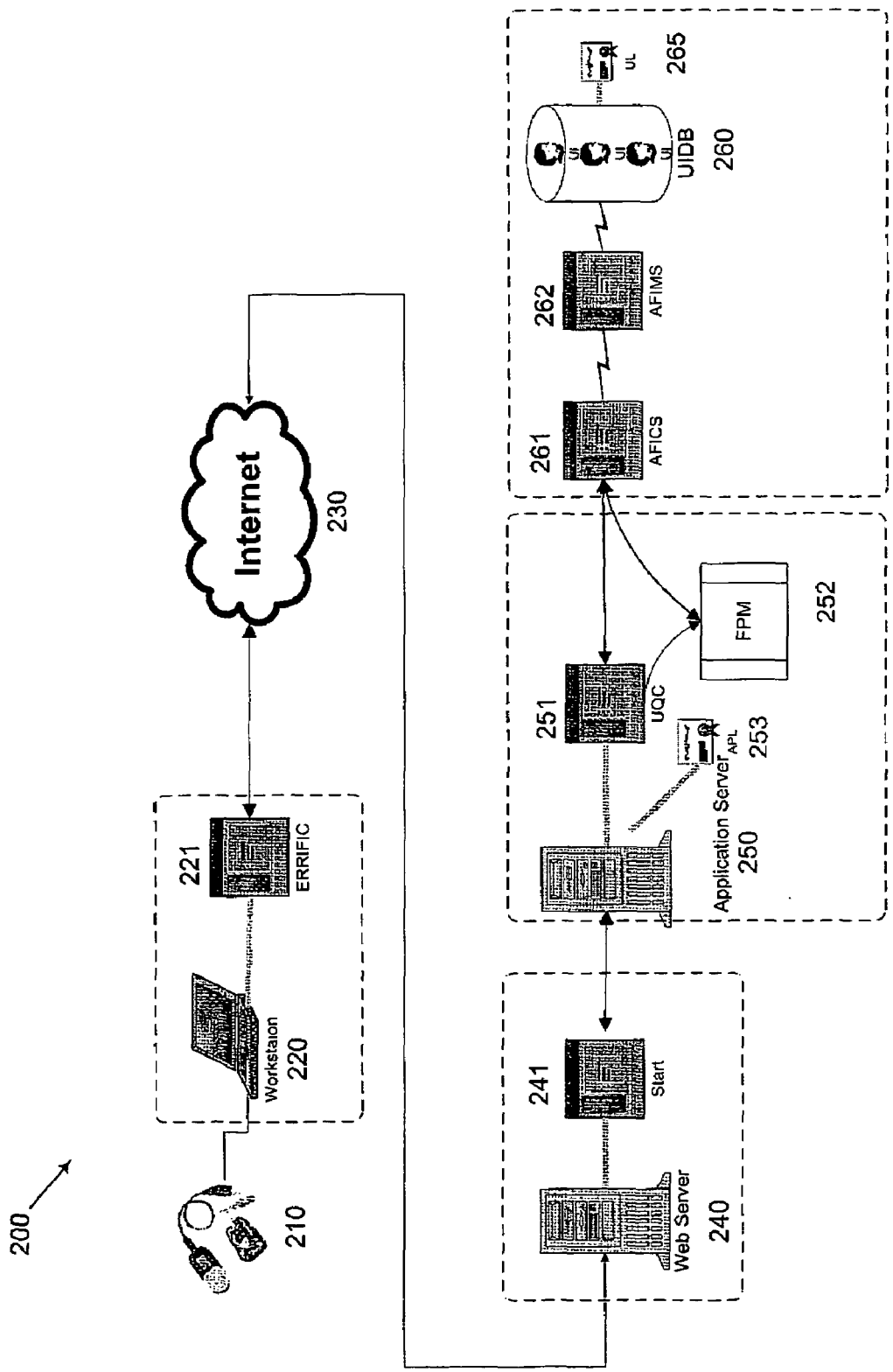
FIG. 2 is a schematic illustration of an authentication and identification system in a network environment, including components according to some demonstrative embodiments of the invention.
Figure 3:
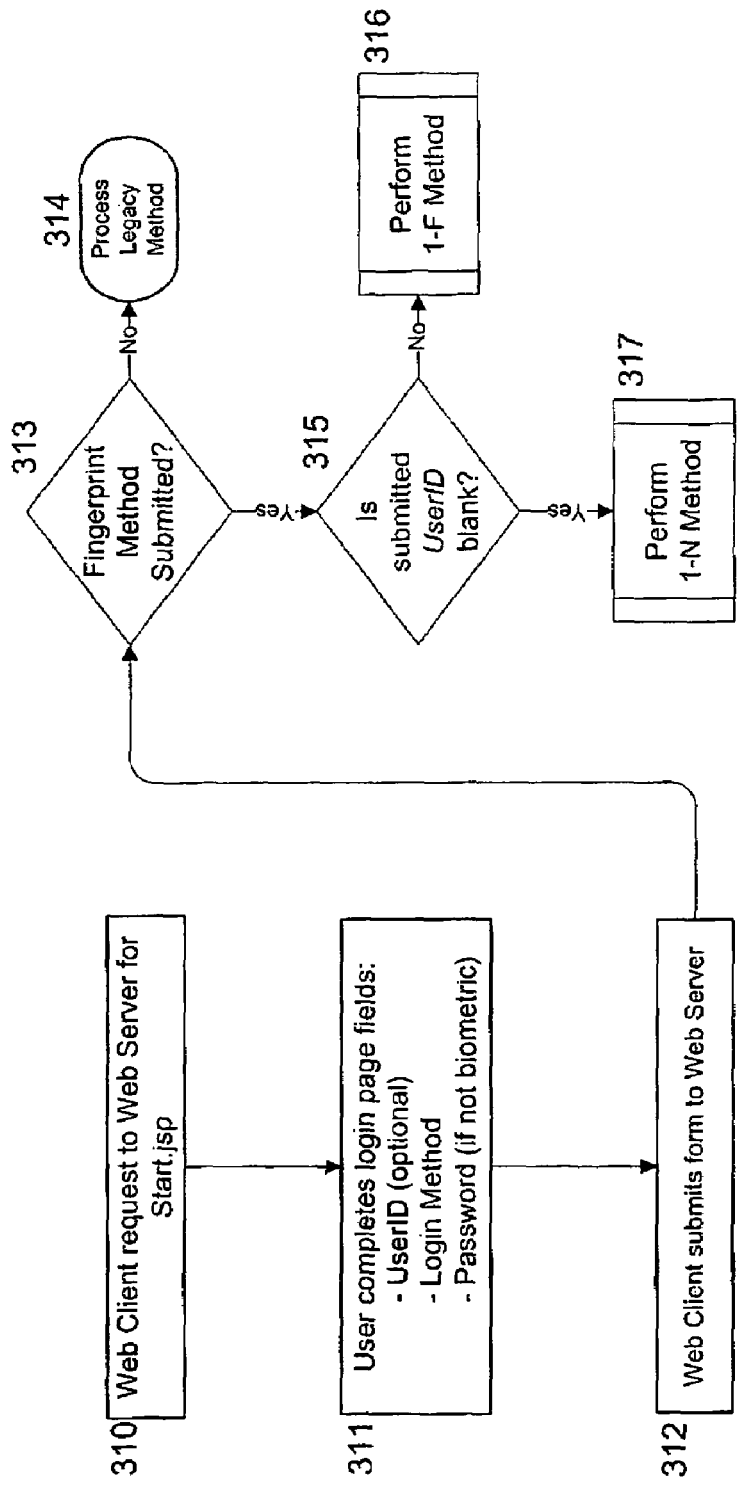
FIG. 3 is a simplified, top level, flow chart of an authentication method according to some demonstrative embodiments of the invention.

FIG. 2 schematically illustrates a system 200 architecture similar to the architecture as FIG. 1, showing a number of functional components of the EAMS associated with the authentication process. In addition to hardware elements, e.g., a biometric imager, a workstation 220, a communication network (e.g., Internet) 230, a web server 240, an application server 250 and a Unique Identities Database (UIDB) 260; the following EAMS software modules are shown in place on their respective hardware elements: an Enhanced Rotation and Reader Interoperable Fingerprint Image Capture TERRIFIC) application 221, a Start program 241, (a Java servlet) a UserQuery Class (UQC) 251, a Fingerprint Method (FPM) module 252, an Application License (APL) 253, an Advanced Fingerprint Collection Server (AFICS) 261, an Advanced Fingerprint Matching Server (AFIMS) 262, and a User License (UL) 265. It should be appreciated that other implementations of these functional modules, e.g. with a different distribution of specific functions or written in different programming environments, may be employed without departing from the scope of the present invention. The EAMS may also include a number of other methods and modes that may be part of the authentication process. These other software elements will be described throughout the course of the description.

ERRIFIC 221 may be implemented as a Tier 1 client side software application bundle or as dedicated hardware. During authentication, ERRIFIC 221 may capture a live sample image, e.g., a grayscale image, of the user's fingerprint from biometric imager 210. ERRIFIC 221 may then run an extraction routine on the sample image to create an advanced fingerprint template (AFIT). In some embodiments, this extraction process and subsequent matching process may be based on a vector code technology, such as is available from 123ID, e.,g., as described in U.S. Pat. No. 6,002,787, with related technologies described in U.S. Pat. Nos. 5,748,765, and 6,289,111 and incorporated herein by reference. The extraction process may generate a unique binary number for every fingerprint image sample if a captured fingerprint image's quality is at or above a predetermined, configurable, minimum quality threshold. This quality threshold may be different for each imaging device. Scoring of fingerprint image quality is discussed in further detail below.

Next, ERRIFIC 221 may encode the AFIT with a server generated time stamp and may encrypt the result into a time-sensitive Transport Unit (TU). The resulting TU may then be transmitted over the network. This process may be included in the client side portion of an Anti-Spoofing/Hacking (ASH) protection of the EAMS that may identify, block, record, and support the investigation of attempted attacks on the fingerprint matching system from potential rogue templates that may be presented to it for authentication. In some embodiments of the invention, the ERRIFIC may send a request for the current time to a trusted time server on the network. The trusted time server may respond by transmitting a time stamp of the current time back to ERRIFIC 221 on workstation 220.

A Tier 2 Start 241 module, which may be implemented by software running on web server 240, e.g. as a Java servlet, or by dedicated hardware, may provide a sample menu of authentication choices to an enterprise user. These choices may include an EAMS delivered biometric authentication as well as legacy system delivered pie-existing authentication, such as password ox token-based authentication, as is known in the art. For ease of compatibility with numerous commercially available web servers, some embodiments may implement Start 241 using Java Server Page (JSP) technology from Sun Microsystems. As an extension of Sun's J2EE, JSP servlets are platform independent and decouple web page design from the underlying dynamic content. This independence enables the overlay of the Fingerprint Method listed in Start 241 and other portions of the EAMS on an enterprise's existing web and application servers.

A Java Servlet UQC 251 may be called when a user selects biometric authentication such as using the Fingerprint Method described herein. In the some embodiments such as that shown in FIG. 2, it may run on Application Server 250; however, it may also run on the Java Virtual Machine (WVM) of a web server if no application server is present. In both instances, it may be designated as a Tier 2 application. The UQC 251 servlet may control the EAMS authentication process forwarding from the application server side. If biometric authentication is selected, the UQC 251 may activate a FPM 252 module. In some embodiments, the FPM 252 may use the UQC 251 to call OCX client side software on Workstation 220 to capture an image, construct the AFIT, and transmit the TU. The FPM 252 may also validate the APL 253 and forward the TU to an AFICS 261, a process described in more detail below.

The AFICS 261 and an AFIMS 262 may be back-end server applications that, in some embodiments, may be installed on or more servers collocated with a UIDB 260 in a secure area. AFICS 261 may be a Tier 4 component and may manage the non-biometric database query portion for each user authentication session. Specifically, it may aggregate, queue and forward the IUs for AFIT matching to AFIMS 262, which may also be a Tier 4 software element. Depending on the authentication method, these steps may be preceded by a query of the user supplied UserID in some embodiments. By separating the session management from the actual matching process, AFICS 261 and AFIMS 262 may be physically and/or logically located on separate servers for improved performance and/or enhanced redundancy, and/or enhanced security. This separation provides flexibility and ease of scalability and migration as the number of applications and users that employ biometric authentication increases. Communications between AFICS 261 and AFIMS 262 may be effected on different ports via secured IP channel or similar means.

Although the demonstrative embodiment of AFIMS 262 described herein is a fingerprint matching server, it should be appreciated that AFIMS 262 may be a matching server for templates of other biometric identifiers without departing from the scope of the present invention. For each incoming request, AFIMS 262 may expose the AFII by decrypting the IU. If the time stamp embedded in the TU is valid, the application may perform the actual biometric matching against the templates stored in UIDB 260. In some embodiments for fingerprint matching, the AFIMS 262 may utilize the same vector code technology developed by 123ID to compare the decrypted AFIT in a one-to-many matching algorithm or a one-to-few matching algorithm depending on the information submitted by the user. Upon matching completion, AFIMS 262 may return a response code to UQC 251 that conveys the results of the matching.

In some embodiments, UIDB 260 may contain the records for all enrolled user. At a minimum, each completed record may include user type, UserID, user mode, the templates for all of a user's enrolled fingerprints, which finger or fingers ate designated as duress finger(s), and other administrative parameters for each used, including exception-mode passwords and user photographs. User type may be one of two types, standard or VIP, the primary difference being that VIP users are allowed to trigger a duress mode which is described below. UserID is the user's identification string that may be assigned by the enterprise uniquely to every user. The EAMS may accommodate any variety of UserID formats in terms of combinations of letters and numbers as well as overall length within the scope of the present invention. One feature of the EAMS may be that the UIDB retains all UserIDs ever entered to enable detection and avoidance of any potential fraudulent re-enrollment at a later time. Comparing the data for a new UserID against the data for all existing UserIDs may be required for alias detection and elimination, which can be a key feature of the EAMS "alias-free" enrollment process The user mode may be an indicator of the user's state with respect to authentication type. For one preferred embodiment, the following ate the user modes utilized by the EAMS: normal (N), inactive (I), exception (E), and duress (D). The implementation of these modes will be discussed in a later section; however, a brief overview of their roles in some embodiments is given here.

The normal mode is that for routine authentication—a user is active and authorized to access any of the enterprise applications using the EAMS. The EAMS may require lower maintenance compared to most token or password based access systems, for reasons including the user's status remains active indefinitely; i.e., there may be no expiration for user status and/or device (token), no need to set or reset static passwords, no need for users to remember static passwords, and minimal ongoing adjustments to user updates needed. EAMS inherently provides this benefit because of the uniqueness of the biometric identifiers for each individual and the EAMS ASH protection against replay or any type of injection of the scanned template. Reducing maintenance may translate to cost reduction and increased acceptance for providing secure authentication with the EAMS as compared to current authentication systems.

The inactive mode is for users who are not authorized for EAMS authentication. These users may include past employees, employees for whom biometric authentication has not yet been activated, employees on suspension, seasonal workers, consultants, and users for whom a potential alias (PA) record may exist. The exception mode may be activated for an authorized user in the event that a biometric imaging device is unavailable to that user. A key feature of the EAMS is that may provide a secure exception mode authentication method.

The duress mode enables a VIP user to indicate to the EAMS that he is being coerced into logging on. This mode may be critical for protecting the integrity of the application in the event that a user is being forced into logging onto the application. By logging in with a finger that has been previously designated as a duress finger, a VIP user may be able to alert the EAMS that he or she is logging in against his or her will. Once a VIP user enters duress mode, the only way for the user mode to revert back to normal is through an administrative intervention. Without a system administrator's resetting the user's mode, the EAMS may keep the user's account disabled against any type of EAMS authentication (biometric and exception) assuming that the user remains under duress for any subsequent attempts to use a different finger or other EAMS method for authentication.

As mentioned earlier, because of the sensitive nature of the data stored in UIDB 260, it is expected that some implementations of EAMS may have the UIDB 260 in a secure facility. All communications with UIDB 260 and associated software AFICS 261 and AFIMS 262 may utilize a secure communications protocol such as through secure sockets layers (SSL).

A UL 265 may contain a set of the maximum number of each different user-type licensed for the enterprise whose users are being authenticated by the EAMS. In some embodiments there may be two user-types: standard, and VIP, corresponding to the user's rights for enabling duress fingers (mode). Whenever a new user record is entered into UIDB 260, the User License Verification Method (ULVM) may calculate a current sum of that user type in UIDB 260 and may compare the result against its corresponding maximum value in UL 265. If the calculated number is below the maximum, entry of the new user record may proceed to the next step. If the number of users in UIDB 260 exceeds a predetermined percentage of the license maximum, notifications may be sent to the administrators for the enterprise. At 100% of license maximum, no new users can be added to UIDB 260 until a larger license number is obtained and or other users are deactivated in UIDB 260. If a user is switched from one type to another, the values in UIDB 260 may be updated and the sum calculation may change accordingly.

In addition to user type, UL 265 may include a maximum number of users with one or more e-templates. E-templates are extracts of enrolled templates stored in a separate table in the UIDB and may be exported to physical access systems. Authentication of this type may be needed for existing physical access control to a facility, which may use a 1 kilobyte maximum template size versus the conventional 5 kilobyte or larger template size for logical access to enterprise applications, without re-enrolling the user in such a system. The extracted e-template may be used as the template for a one to few or other comparison check in such systems.

The optional e-template licensing may be independent of user mode in EAMS. A ciphered value of the maximum number of users that are licensed to have one or more e-templates extracted may be contained in UL 265. Each e-template licensed user may be permitted to have one or more e-templates extracted from their enrolled templates. Each time there is a request to extract a first e-template, a total number of users that have one or more associated e-templates may be calculated and compared to the maximum value in UL 265 prior to extraction. In some embodiments, the e-template status for each user may be tracked with a single binary field in UIDB 260. The default value for this field may be 0. After the first successful extraction, the value set to 1. Additional extractions for each user may not be tracked by the EAMS.

EAMS authentication may be a multistep process involving the user at a workstation 220, the web server 240, the application server 250, and the UIDB 260. The process may proceed along one of several paths depending on the user mode and type of login requested. A number of the innovations associated with the EAMS design come into play during authentication and are discussed below.

FIGS. 3, 5, 6, 7, 8 and 9 are a series of schematic illustrations of authentication methods in an exemplary process by which an enrolled active user at a remote workstation 220 may be authenticated for an enterprise application resident on application server 250.

The user may initiate the process by requesting access to the desired application URL. The web browser on workstation 220 may send an HTTP or HTTPS request to Start 241 on web server 240 in step 310. The Start 241 program may respond by displaying a login page in the web browser on workstation 220.

FIG. 4 is a schematic illustration of an exemplary login screen for a user. The screen contains fields for UserID, login method, password. For the login field, the user may choose from a preset list of choices. As shown in FIG. 4, a representative set of choices can include but may not be limited to: Fingerprint, Password, SafeWord, and SecurID. The Fingerprint Method is an exemplary biometric identification method supported by the EAMS. The balance of this discussion assumes fingerprint identification; however, other biometric identifiers may be used without departing from the spirit of the present invention. The other, methods shown in this exemplary embodiment are legacy methods, i.e. login methods that predate the implementation of the EAMS. A feature of the EAMS is that it may simultaneously accommodate both biometric and alternative legacy authentication systems thereby enabling an enterprise to transition directly from an earlier system to biometric authentication. The timing for conversion to exclusively biometric authentication may then be at the application manager's discretion or otherwise as the enterprise customer's policy entails.

Depending on the chosen login method, text input for the UserID field may be coded as either optional or mandatory. UserID may not be necessary fox the EAMS Fingerprint Method; however, for some embodiments of the present invention, an enterprise may require UserID to reduce AFIMS 262 matching time. A second reason to require UserID may be to ease the transition from legacy to biometric authentication by adding the familiarity of a UserID as part of the authentication process. This flexibility to accommodate different corporate desires may increase the attractiveness of the EAMS to commercial clients for managing the migration to biometric authentication. A third reason may be to support the exception mode process.

If there is no UserID entered for fingerprint authentication, the AFIMS 262 may search against the entire database of templates for a match in what is known as a one-to-many (1-N) method. Entering the UserID enables the AFIMS 262 to reduce the matching process to comparison with only the templates that correspond to the entered UserID and is known as a one-to-few (1-F) method.

The remaining field, password, may be only used to support legacy systems. It may be disabled when fingerprint or other EAMS authentication is selected.

Once the user submits the form (step 311), the client web browser on workstation 220 may send the form data back to the Start servlet (step 312). In Step 313, if a legacy login method is selected, the Start servlet may pass authentication back to the legacy control software for processing (Step 314). In this instance, the EAMS then may play no further role in authentication after Step 313.

If the Fingerprint (biometric) method is selected, the Start servlet may call UQC 251 in step 315 and may pass the value of the UserID to it. The UQC 251, in turn, may forward the UserID value to AFICS 261. AFICS 261 may queue the request for processing to AFIMS 262. Once AFIMS 262 is called, it may determine whether or not the UserID field contains a null (blank) value. This decision, step 315, may govern which EAMS biometric authentication method will be employed. If a UserID was provided, the AFIMS 262 may perform a 1-F (one to few) type of search (step 316). If the UserID field is blank, the AFIMS 262 may proceed with a 1-N (one to many) search (step 317).

Figure 5:
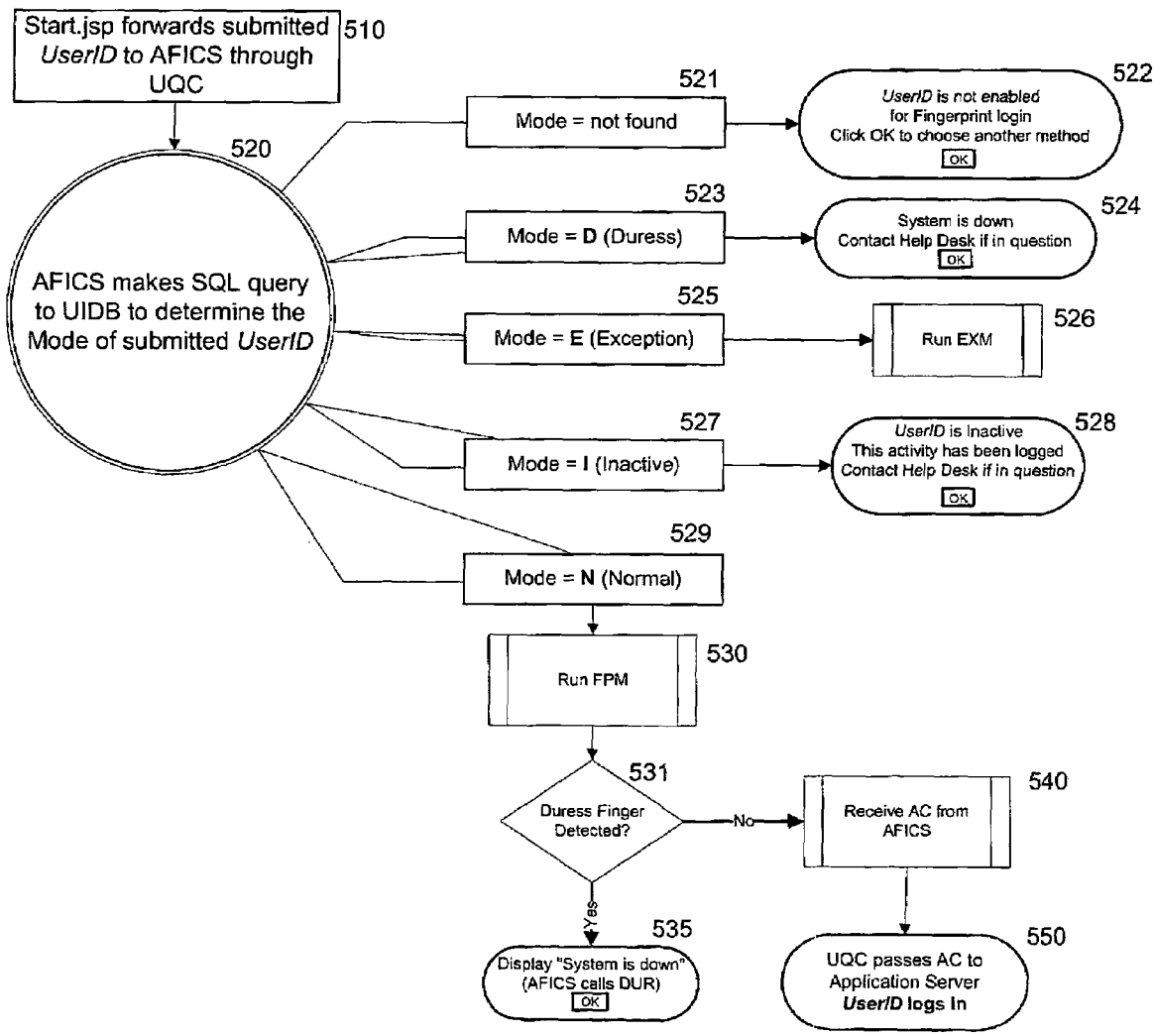
FIG. 5 is a schematic flowchart of the 1-F authentication method according to some demonstrative embodiment of the invention.

FIG. 5 is a schematic flowchart of the 1-F Authentication method. As mentioned earlier; a 1-F search can be more efficient because the database search may be limited to those template entries corresponding to the entered UserID. The initial step in this process, step 510 may correspond to step 315 of FIG. 3: the Start servlet may forward the contents of the submitted UserID field to AFICS 261 through UQC 251. In step 520, AFICS 261 may execute an SQL query on UIDB 260 to determine the user mode for the submitted UserID. The odd-numbered steps 521-529 show a possible set of the different outcomes for this search with corresponding branch paths. In step 521, if the submitted UserID is not found in UIDB 260, UQC 251 may return a message back to the remote user indicating that the UserID is not enabled for fingerprint authentication (step 522) or similar message. The EAMS may take no further action at this point. If the user is a VIP and is in duress mode (step 523), UQC 251 may respond with a message to the user that minimizes the risk to the user from harm. One representative message for this step 524 is "System is down. Contact Help Desk if in question."

If the submitted UserID is inactive (step 527), UQC 251 may return a message indicating that the UserID is inactive such as the exemplary message for step 528 in FIG. 5. As with duress mode, in some embodiments only an EAMS system administrator can change a user's mode from inactive to active and vice versa.

The branch headed by step 529 shows the flow during normal mode operation. Once AFICS 261 has established that the user is in normal mode, it may run FPM 252 (Fingerprint Method), and if a match is found, may generate the authorization code (AC). A schematic flowchart of FPM 252 is presented in FIG. 7 and will be discussed below. As part of the FPM 252, the AFIMS 262 may check to see if the AFIT corresponds to a duress finger (step 531). If the fingerprint submitted matches a VIP user's duress finger, the AFICS 261 may switch the user to duress mode (step 535) by calling the Duress method (DURM) and the EAMS may transmit an innocuous message back to the user to indicate that access is denied. One such representative message, shown in FIG. 5 for step 535, is "System is down".

When the DURM is called, the EAMS logic may presume that a VIP user is in an emergency situation. In addition to the "Server Unavailable" or similar message (see FIG. 5, steps 535 and 635), the EAMS may be preconfigured to flag a customer's emergency system(s). The emergency response may also include an alert email to the administrator or help desk with UserID, application name, date, and time of occurrence. UIDB 260 may also disable access to any other EAMS-enabled applications for that user until the system administrator sets the user mode back to either normal or exception.

If the user mode is normal, then the AFICS 261 may generate and pass an authorization code to the UQC 251 (step 540). The UQC 251 may forward the authorization code to application server 250, and the user may log in at step 550. At this point, the application server may invoke other access controls that also limit the user's rights.

Figure 6:
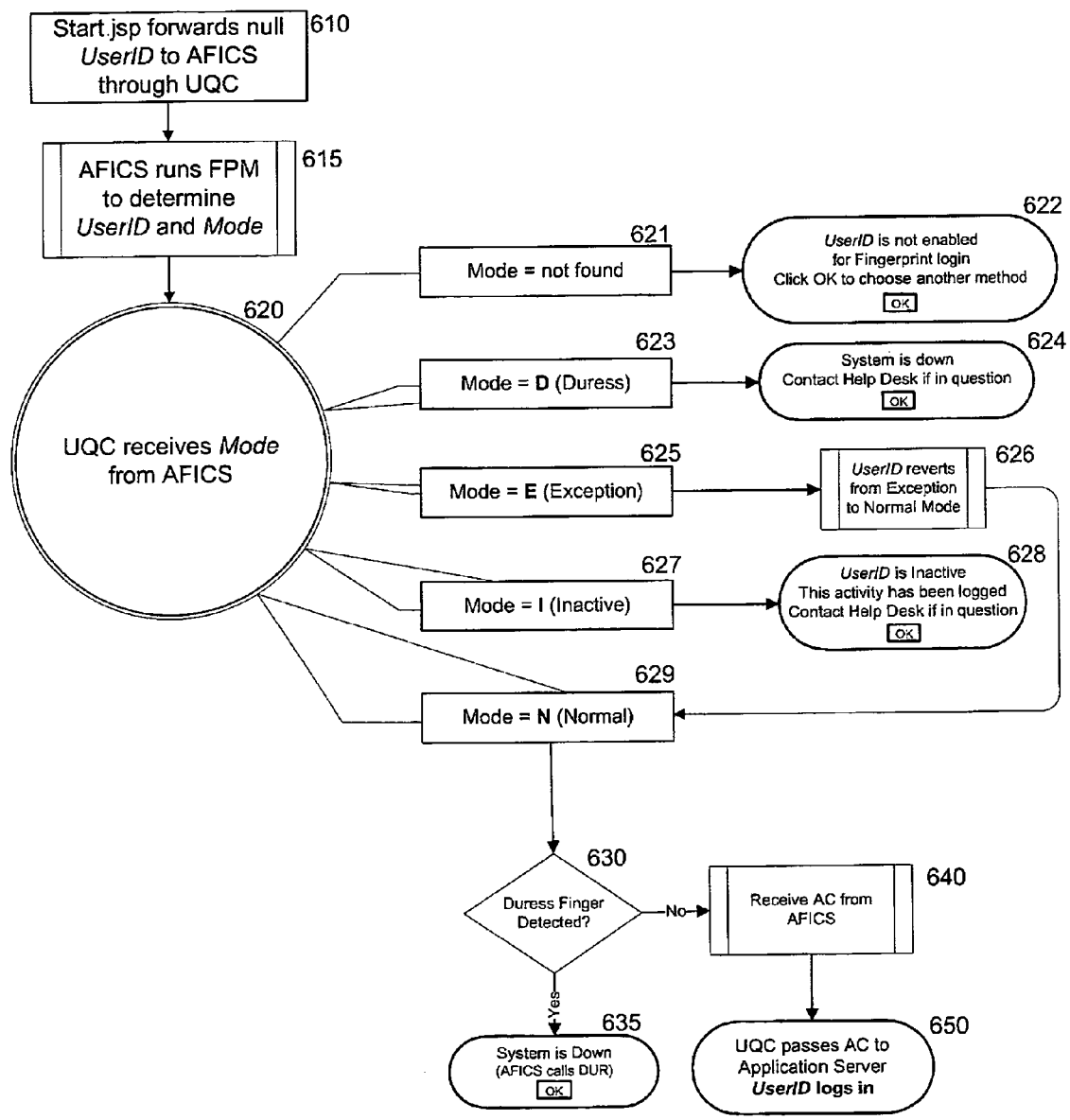
FIG. 6 is a schematic flowchart of the 1-N authentication method according to some demonstrative embodiments of the invention.

For a blank submitted UserID field, the UQC 251 may call AFICS 261 to run the exemplary 1-N method illustrated as a schematic flowchart in FIG. 6. After receiving the null value for the UserID field (step 610), the UQC 251 may call AFICS 261 to run FPM 252 to determine the UserID and mode in step 615. The process may continue with the same number of different user mode branches as that for the 1-F method. If the FPM 252 can't find a match for the submitted fingerprint, then AFICS 261 may determine the user mode to be not found (step 621) and may return a message to the user through UQC 251 indicating that the login attempt was unsuccessful (step 622). For a VIP user that is in duress mode (step 623), the AFICS 261/AFIMS 262/UIDB 260 may deny access to any valid fingerprint match for that user and may return a message through UQC 251 that minimizes risk to the user (step 624). If the user has submitted a valid fingerprint while in exception mode (step 625), then the AFICS 261/AFIMS 262/UIDB 260 may switch the user back from exception to normal modern step-626. Processing may then continue as it would for a normal mode user in step 629. For a user that is inactive (step 627), the AFICS 261 may return a message to the user through the UQC 251 denying access (step 628).

When the user mode is normal and the FPM 252 has returned a valid match for the submitted fingerprint, the process flow may proceed from step 629. Because FPM 252 has already been run, the AFIMS 262 may have identified if the fingerprint match corresponds to a duress finger (step 630). If the fingerprint submitted matches the VIP user's duress finger, the AFICS 261/UIDB 260 may switch the user to duress mode (step 635) by calling DURM and the AFICS 261 may transmit an innocuous message back to the user through UQC 251 to indicate that access is denied If the user mode is normal, then the AFICS 261 may generate and pass the authorization code to UQC 251 (step 640). UQC 251 may forward the authorization code to application server 250, and the user may log in (step 650). At this point, the application server may invoke other access controls that also limit the user's rights.

Figure 7:
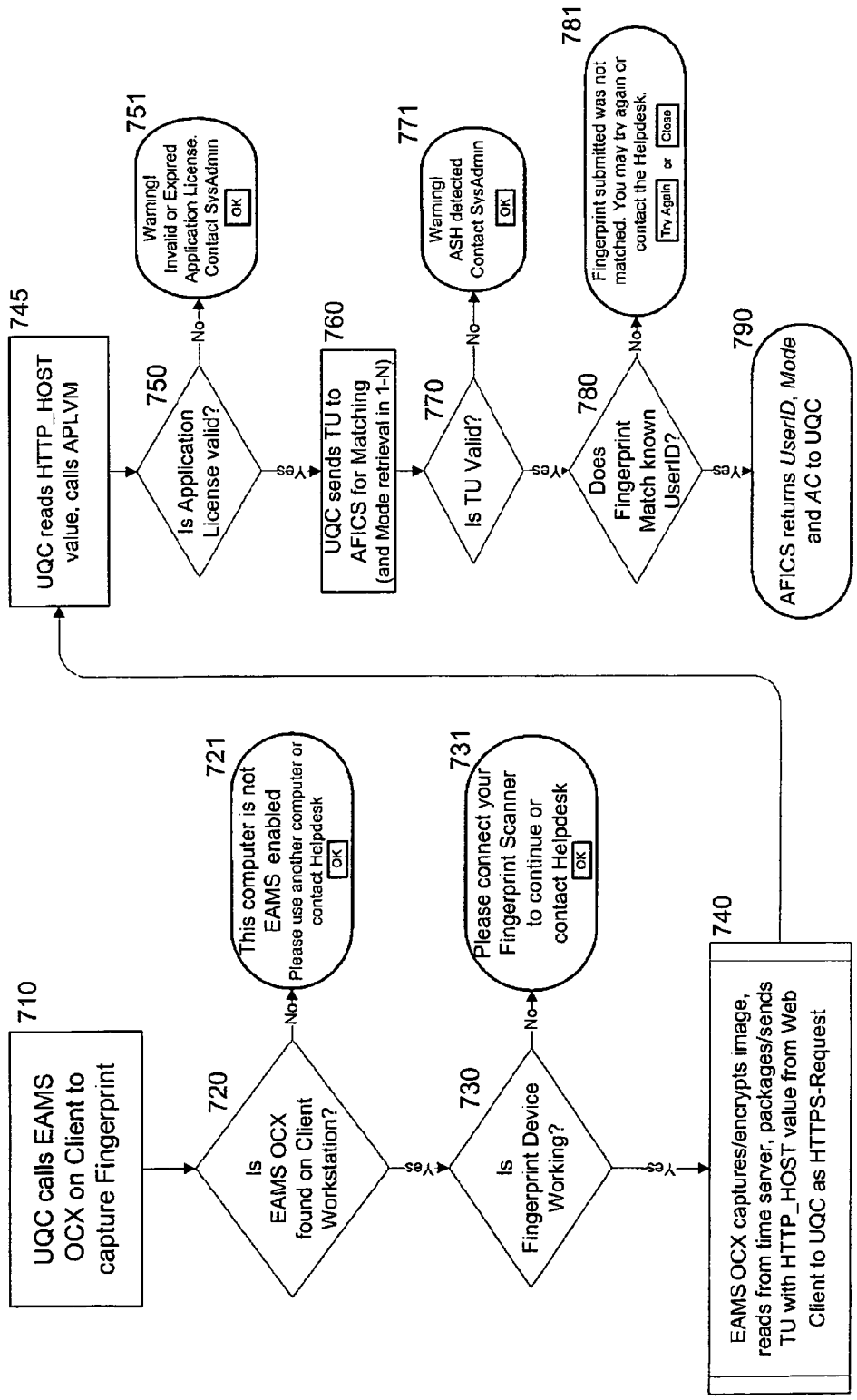
FIG. 7 is a schematic flowchart of the Fingerprint authentication method according to some demonstrative embodiments of the invention.

Because no UserID was entered, the 1-N method may call FPM 252 to identify the user and user mode. By contrast, the 1-F method may first check the UserID using a SQL query against the UIDB 260. If the UserID is found and the user is in normal mode, the AFICS 261 then may call FPM 252. The AFICS 261 may manage the FPM 252 and initiate it by calling an ActiveX (OCX) component of the ERRIFIC 221 module on the client (remote) workstation 220 through UQC 251 in step 710 as illustrated in the schematic flowchart of FIG. 7. Although the embodiment described herein uses an ActiveX implementation for certain components of the remote workstation module to achieve a high degree of compatibility across multiple hardware platforms and operating systems, other technologies for sharing information between applications and platforms may be used. This OCX component may be responsible for capturing the electronic grayscale image from the biometric imaging device, extracting an AFIT, and packaging it into a TU for transport. In step 720, the UQC 251 may confirm that the EAMS OCX component is installed on the workstation requesting access. If it is not, the UQC 251 may return a message to the user indicating that the workstation is not enabled for biometric authentication (step 721). One representative message, shown in FIG. 7, is "This computer is not EAMS enabled. Please use another computer or contact Helpdesk." If the EAMS OCX component's presence is confirmed, it may verify that the fingerprint imaging device is working (step 730) and active. If no device is detected, the OCX client may prompt the user to attach a device or contact the helpdesk (step 731). If the device is working, the OCX client may prompt the user to provide a finger for scanning. It may then capture the image (step 740) by instructing the device to collect the image and subsequently close the device's sensor. The ERRIFIC 221 may process the image (step 740) by first converting it to an AFIT, then encoding the AFII with a server generated time stamp and encrypting the combined package as a TU.

Figure 8:
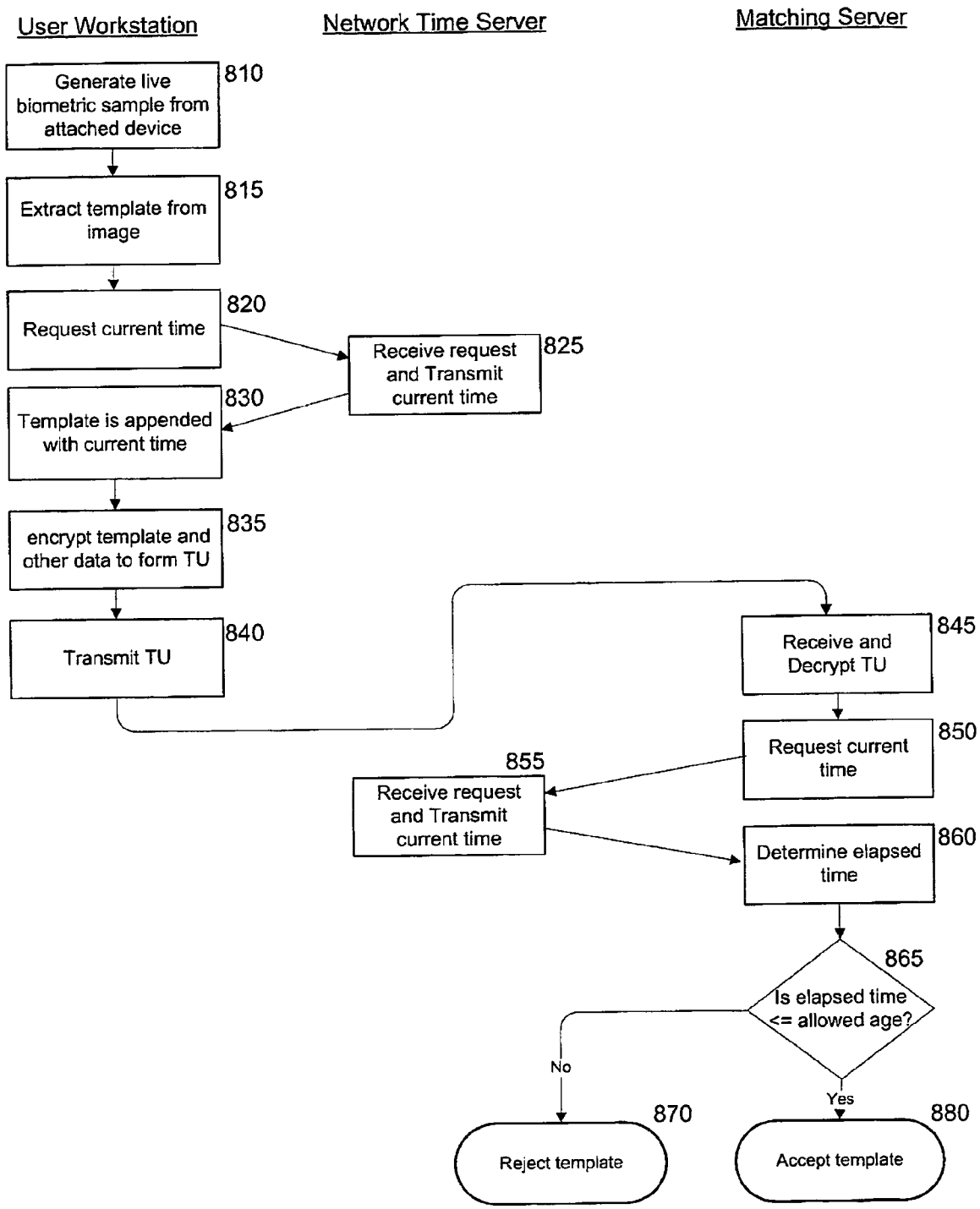
FIG. 8 is a schematic flowchart of a method for creation of and secure transmission of a Transport Unit according to some demonstrative embodiments of the invention.

FIG. 8 is a schematic flowchart of an exemplary method for the creation of and secure transmission of a TU to the AFICS 261/AFIMS 262 for fingerprint matching. Steps 810 through 835 expand on how an image may be captured and converted into a IU. In step 810, a user may scan his fingerprint on Biometric imager 210. Next, in Step 15, the ERRIFIC 221 module on Workstation 220 may extract a fingerprint template from the image. The ERRIFIC 221 module may also calculate an image quality value for optional inclusion in the TU. The module may then send a request to the network time server for the current time to record when the template was created.

In some embodiments, the module may send the request for the current time to a relay agent which, in turn, may direct the request to the trusted time server. Having a relay agent may enhance the reliability of the identification/authentication process by centralizing the communications to the designated time server and by making it easier to access an alternate time server when the primary time server is unavailable. The relay agent may forward the request to a primary time source. If it receives no response within a configurable amount of time, the relay agent may send the request to a secondary time source. Implementations for large enterprises may include a sequence of two or more time sources. In some embodiments, the time source or sources may generate the current time response according to the network time protocol (NTP). Using NTP may eliminate potential relative tiring issues when the time stamp is verified as part of TU processing. Once the time response has been generated, it may be sent back to the workstation (step 825).

After receiving the current time, the ERRIFIC 221 module may append the time response as a time stamp to the fingerprint template and, in some embodiments, an identifier for the imaging device and the image quality value (step 830). In step 835, the template, time, and any optional data may be encrypted to form the TU for transmission to the matching server (AFIMS 262) in step 840. AES (Advanced Encryption Standard, a NIST specification for encryption) encryption of the two together with a symmetric key specified by the AES may be employed to ensure that the neither the time stamp nor the AFIT can be deciphered in a viable timeframe by an unauthorized process or system.

Encoding an AFIT with a time stamp and encrypting the resulting package (TU) may solve the potential replay problem for remote access using biometric authentication. In many current biometric authentication systems, the electronic signal from the biometric imager can be intercepted and captured by a Trojan horse or other intrusion or spyware software on the client side and/or in transit. Replay of this bitstream into the authentication system at a later time could potentially allow fraudulent access. For EAMS, if an unauthorized user or process were to record the electronic transmission of the TU and later replay it back into the system as a means of attaining unauthorized access, the time stamp portion of the TU may no longer be valid, and the EAMS may deny access and, in some embodiments, send an administrative alert. Consequently, it may be possible to send TU's over public access networks without compromising privacy or security.

Along with the TU, the OCX client may send an application identifier, for example, the HTTP_Host value from a web-enabled client, e.g. a web browser (on the remote user workstation) or other web client, to the UQC 251 as an HTTPS_Request. The HTTP_Host value is a hidden field in the web browser form that contains the name of the application server being contacted. By using HTTPS as a default transport protocol, the client browser may send the data to the application server 250 over SSL port 443 to ensure secure communications. Other application identifiers and other secure forms of communications may be used without departing from the scope of the invention.

After reading the submitted HTTP_Host value, UQC 251 may call the Application License Verification Method (APLVM) module (step 745). The APLVM may be a Tier 2 application that verifies that EAMS authentication is available on the application for which the user is requesting access. Each EAMS-enabled application server 250 may store an application license (APL), e.g. in a file, that may contain at least the following data: a cipher comprising the fully-qualified Hostname of the application, the customer (enterprise) name, and an expiration date for the license. In some embodiments, the license data may be written in an XML file named Alicense.xml, although other file names and formats may be used.

Using an application identifier such as the HTTP_Host value for application license verification is an innovative means for protecting access to licensed applications by eliminating the threat of unauthorized servers, decoy servers, redirectors, and other forms of infiltrating the authentication process because, in the case of the HTTP_Host value, this field is inaccessible by the web client's user. Security of the process may be further enhanced by encryption of the transmitted HTTP_Host value and creating a 1-way cipher of that value on application server 250 to prevent unauthorized use of the license. Storing a separate APL for each application on its respective server may provide added security by isolating APLs from each other and may enable the EAMS to be easily scaled up to multiple applications without any reconfigurations which may cause service disruptions. Each time a customer requests a new application to be supported by the EAMS or an update to an existing license, a new APL may be generated by a offline license generator managed by the EAMS software and or support vendor. The APL may then be forwarded to the customer who installs it on application server 250 as APL 253. The EAMS software and of support provider may then charge fees on an application by application basis with direct visibility as to which applications and how many have been licensed for EAMS authentication. On the customer side, the software manager may have clearly defined controls and cost allocations for each application.

To validate a user's request, the APLVM may check the HTTPS_Request to read the HTTP_Host value. This value may be compared with the application name in the Alicense.xml file in step 750. If the license is found, not expired, and the application name matches, the licensed is determined to be valid and the authentication process may be allowed. In some embodiments, if APL 253 has expired or that the HTTP_Host value does not match the application name within Alicense.xml, the EAMS may send an alert to the system administrator and return a page or other communication to the remote user indicating an authentication problem such as the exemplary message in step 751.

Once the APLVM has validated APL 253, UQC 251 may route the TU to AFICS 261 (step 760) via SSL for decryption, validation (step 770), and fingerprint matching (step 780). If the 1-N method is being executed, then AMICS 261 may also retrieve the user mode. Although not shown in the accompanying figures, AMICS 261 may receive the TU, queue it, and forward the TU to AFIMS 262. The following steps are shown in more detail in FIG. 8. Upon receipt, the AFIMS 262 may decrypt the TU and expose the AFIT and time stamp (step 845). A preset allowable age parameter may be present in the AFIMS 262 configuration as a threshold to determine a time duration for which the associated AFIT will be valid. If the duration exceeds this elapsed time threshold, a new combination of AFIT and time stamp may be required to gain access. AFIMS 262 may request the current time from the network time server (step 850), which in turn, may transmit the current time to AFIMS 262 (step 855). In step 860, AFIMS 262 may calculate the elapsed time from the time stamp. If the decryption is successful and the elapsed time is within a preconfigured allowed number of seconds, the template may be accepted (step 880) and AFIMS 262 may next process the fingerprint match (step 780). If the decryption fails or if the elapsed time is expired or invalid, then the server side of the ASH may transmit an error code to the UQC 251 servlet which may return an "Invalid or Expired License" or similar type message screen to the user (step 771) and the template may be rejected (step 870). The ASH then may quarantine the TU pending investigation and may send alerts to the preconfigured administrative authorities.

As mentioned earlier, some embodiments of AFIMS 262 may utilize 123ID's proprietary vector code technology for its fingerprint matching although other matching systems may be employed. If the 1-F method has been called, AFIMS 262 may compare the AFIT to the templates stored in UIDB 260 corresponding to the given UserID. For each matching request, AFIMS 262 may return a code to AFICS 261 corresponding to one of the following conditions: normal match success, failure to match, duress finger matched, or server not available. For the normal match success, AFICS 261 may additionally generate and return the authorization code, the UserID and the user mode (step 790). If there is no match, AFICS 261 may transmit a failed match message through UQC 251 to workstation 220 in step 781 such as "Fingerprint submitted was not matched. You may try again or contact the Help Desk."

Returning the duress code may trigger the DURM which prevents access by that user until future administrative intervention. In some embodiments, the message corresponding to the "server not available" code may only be sent when a preset timeout limit is reached for AFICS 261/AFIMS 262 to respond during the fingerprint matching. This situation may arise when communications with AFICS 261, AFIMS 262 and or UIDB 260 are not functioning properly.

To be an effective tool for managing both migration and ongoing usage of biometric authentication, the EAMS may include an exception mode for users who don't have access to an EAMS authorized imaging device. This situation may arise if the device has malfunctioned or has been disconnected, a user does not have access to an imaging device for login, a user can't produce a valid image, etc. A key feature of an exception mode is that it be as secure as biometric authentication. The Exception Method (EXM) for the EAMS may be implemented so that it provides secure access to EAMS enabled applications in a controlled manner with full traceability.

The EAMS EXM is an infrequently utilized method that may be initiated by the enterprise/customer's help desk when a user calls in to report a missing imaging device, device problem, or other situation where an approved imaging device such as biometric image 210 is unavailable at a remote workstation 220. Although the demonstrative embodiment herein is described in context of a help desk operator authorizing the exception mode for the user, it is to be understood that other EAMS system operators or other designated persons may authorize the exception mode for the user without departing from the scope of the present invention. Furthermore, in some embodiments, it may be possible to automate the functions of the help desk operator in initiating the exception mode, e.g. using a web site and an appropriate application program interface.

The help desk operator may ask a predetermined number of identifying questions to verify the caller's identity or other such request for a set of information that uniquely identifies the enrolled user. This set of questions must be sufficiently specific to meet the customer or enterprise policy for confirming identification by telephone. If the user supplies a satisfactory set of correct answers, the help desk operator may initiate a function that places the user in exception mode. To assure proper accountability, the help desk operator may be required to provide biometric authentication as part of initiating exception mode. The initiation function may generate a temporary password valid for an EAMS configuration specified number of authentications and, in some embodiments, a limited lifetime, store it and the expiration date in UIDB 260, and transmit it only to the user by an out-of-band communication, i.e, by a transmission medium other than the one being used for requesting exception mode, such as by email or facsimile. The number of authentications remaining, referred to as the user exception counter value (UECV), may be displayed to the user after each exception mode authentication. If the user fails to provide a sufficient set of correct answers, the help desk operator may note the incident as a possible fraud.

Once the user is placed in exception mode, the user may log in by submitting the Fingerprint Method selection with his UserID. Logging in with a UserID may proceed through the 1-F method shown in FIG. 5 until the EXM may be called in step 526. The user may then be prompted for the temporary password. The user may login pursuant to any access control systems if the submitted password matches the supplied temporary password.

Figure 9:
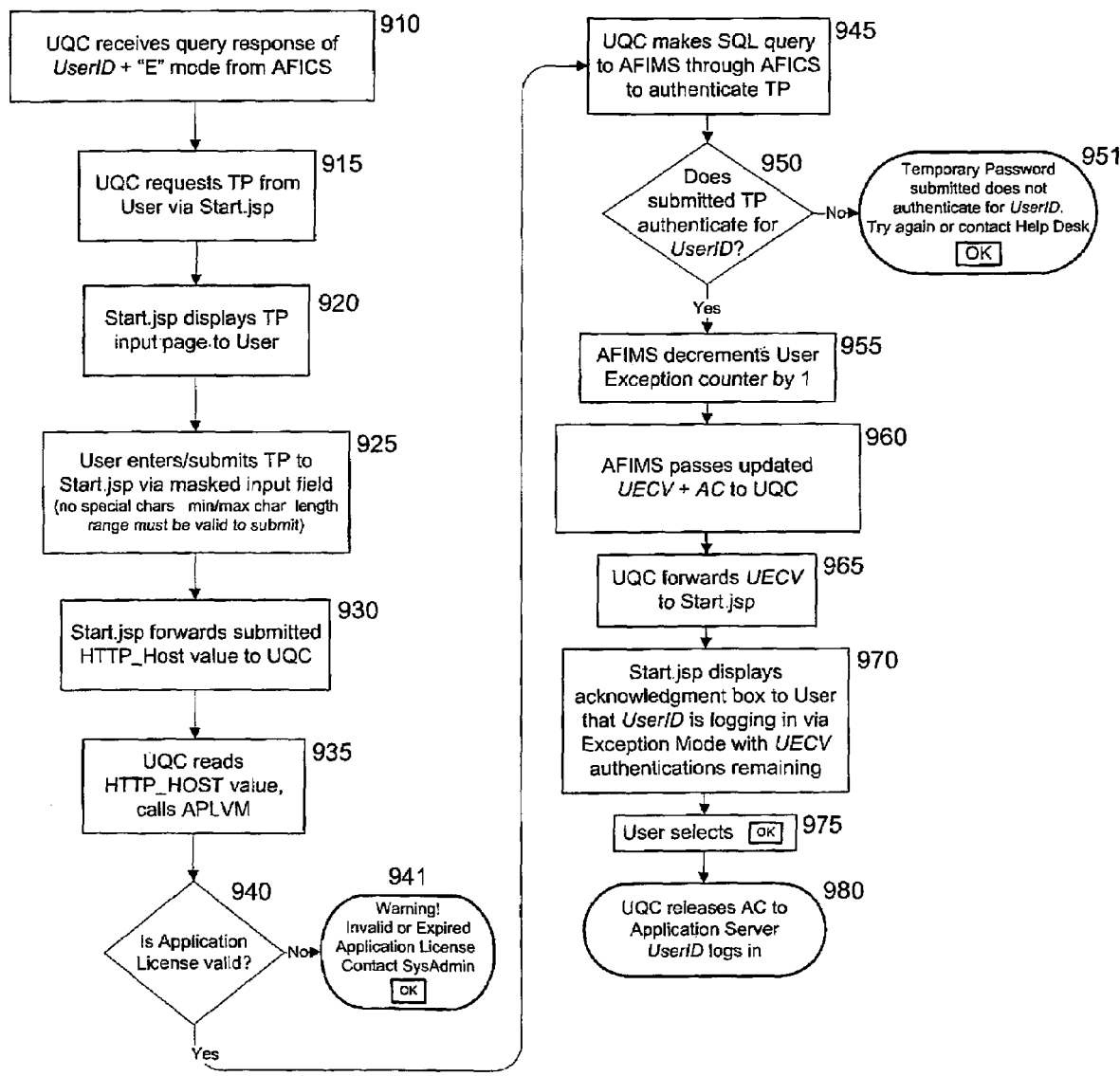
FIG. 9 is a schematic flowchart of the Exception authentication method according to some demonstrative embodiments of the invention.

FIG. 9 is a schematic flowchart of the authentication process for the EXM according to some demonstrative embodiments of the invention. Step 910 may be the same as step 525 for the specific situation of AFICS 261 returning an exception mode user state for the UserID query. When UQC 251 receives the exception mode code from AFICS 261, it may call an EAMS supplied function on application server 250 or other location which may prompt the user for a temporary password (TP) (step 915) This function may display an input page or other field for entering the temporary password in the web browser on workstation 220(step 920). In step 925, the user may enter the temporary password via a masked input field. Although other requirements for the password may be selected by a customer, one demonstrative set is that the temporary password may contain no special characters, and be within a specified range for the number of characters. Furthermore, in some embodiments the temporary password may be encrypted for transmission and subsequently decrypted at the server side.

Start 241 may forward the submitted temporary password to AFICS 261 through UQC 251 (in a procedure not illustrated herein). In addition, the remote client web browser may transmit the HTTP_Host value to UQC 251 as it does in step 740 of the Fingerprint Method. Steps 935, 940, and 941 of the Exception Method may be the same process and may correspond directly to steps 745, 750, and 751 of the Fingerprint Method when UQC 251 may call the APLVM to confirm the validity of application license 253. Once application license 253 is validated, UQC 251 may query UIDB 260 using AFIMS 262 through AFICS 261 to authenticate the submitted temporary password (step 945). AFIMS 261 may compare the submitted temporary password to that stored in UIDB 260 for the given UserID (step 950). If the submitted temporary password does not match, UQC 251 may transmit a message to the user's browser informing the user that the password doesn't match (step 95 1) and access is denied. For a matched temporary password that, in some embodiments, also has not expired, AFIMS 262 may decrement the UECV by 1 (step 955) and pass the updated UECV and authorization code to UQC 251(step 960). UQC 251 may forward the UECV to Start 241 (step 965) which may display a web page to the user informing him that he is logging in via exception mode with the UECV number of authentications remaining (step 970). After receiving acknowledgement by the user (step 9.75), UQC 251 may release the authorization code to application server 250 and the user may log in (step 980).

Although the user has successfully logged in, he may remain in exception mode. In some embodiments, the user may be placed back into normal mode when one of the following conditions is met: the UECV has reached 0; the user provides a valid non-duress fingerprint image (using 1-N) mode, or the user contacts the help desk to manually revert to normal mode. If the user is a VIP and provides a valid duress fingerprint image (using 1-N mode), the user mode may switch from exception to duress.

Figure 10:
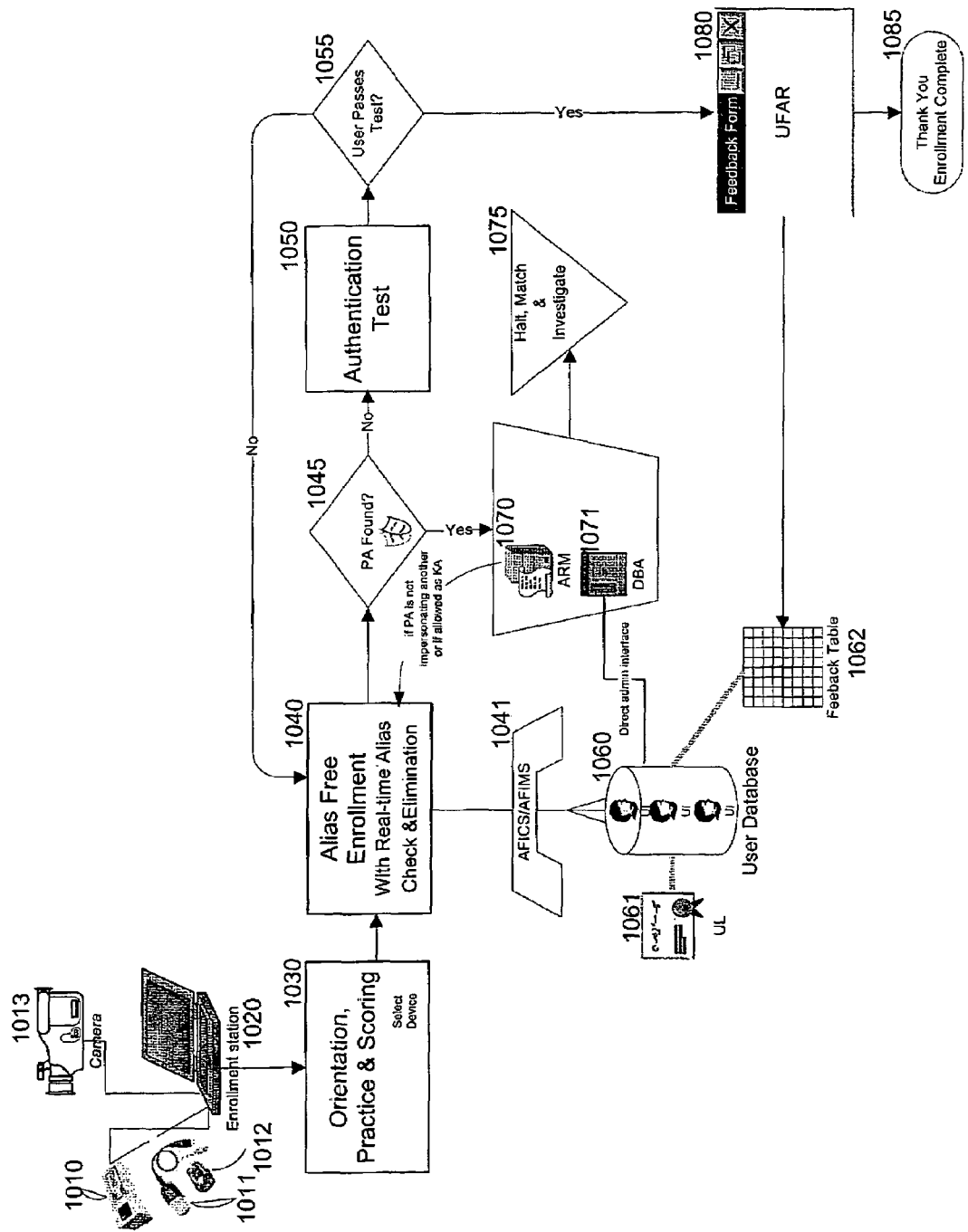
FIG. 10 is a schematic flowchart of the enrollment process according to some demonstrative embodiments of the invention.

The enrollment process for the presently described EAMS has a number of innovative features that may substantially enhance the value of the EAMS for enterprise customers by improving the enrollment experience for the user and protecting the enterprise from falsified enrollment: Some of these features include:

Structured practice fox enrollment
Fingerprint image scoring and optimization for enrollment for each individual finger
Alias free enrollment
Authentication testing before activation
Biometric authenticated feedback post enrollment FIG. 10 is a schematic flowchart of the enrollment process that also illustrates some of the hardware and software elements involved in some demonstrative embodiments of the invention. These hardware elements that may be included in the process are: biometric image is 1010-1012, camera 1013, enrollment workstation 1020, and UIDB 1060. The three major stages of the enrollment process—Orientation, Practice, and Scoring (OPS) 1030; Alias Free Enrollment (AFE) 1040; and Authentication Test (AT) 1050—each may call modules that will be described below. Other functional elements that are activated in enrollment may include: AFICS/AFIMS applications 1041, User License (UL) 1061, Feedback Table 1062, Alias Resolution Manager (ARM) 1070, Database Administrator (DBA) module 1071, and User Feedback Alerting and Reporting (UFAR) 1080. Additional workflow elements may include decision points 1045 and 1055, as well as process 1075.

Although not shown as a separate step in FIG. 10, a process that may be critical for successful enrollment of a new user is verification that the number of users in UIDB 1060 is within the number allowed by UL 1061. The timing of this verification may vary in different embodiments. For example, it may be accomplished as part of a preloading of multiple user records into UIDB 1060. In an alternative embodiment, this verification may take place for an individual user prior to AFE 1040. In all cases, verification may be performed by the ULVM which compares a ciphered value in the UL 1061 against a current total of the appropriate user type, standard or VIP, for the enrolling user. If the calculated total is less than the licensed maximum, the user's record may be added to UIDB 1060 In an exemplary embodiment, the new UIDB entry may include the user's name, UserID, user type, digital photo (taken with camera 1013), date/time of enrollment, name of the enrollment operator, templates, and the grayscale images of the fingers enrolled. Other information may also be included depending on the requirements of the enterprise customer.

An overview of the physical enrollment process is presented first with a more detailed discussion below. The enrolling user may begin enrollment with the guidance of an enrollment operator at an enrollment station 1020. Enrollment station 1020 may be configured with an input device interface capable of accepting all of the input devices used during enrollment. During the initial stage, OPS 1030, the enrolling user may practice generating images with different fingers on a customer determined set of imaging devices (imagers 1010-1012). FIG. 10 illustrates three exemplary devices that are commercially available: device 1010, the CrossMatch V300;

device 1011, the STMicroelectronics TCRB BioTouchKey; and device 1012, the STMicroelectronics TCRU1C Touch-Chip Reader. The resulting report of this practice session may serve as a guide to the enrollment operator in selecting the best available device for each finger to be enrolled.

The second stage may be the enrollment itself, ATE 1040. A user may image each finger on the optimal device for that finger, as may be determined by the enrollment operator. It is to be understood that, although the user may enroll with all fingers, the user can also enroll with any other number of fingers without departing from the scope of the present invention. The images may be submitted as identification reference images to UIDB 1060. An identification reference template may be extracted from each identification reference image. A real-time alias check against all templates in UIDB 1060 may verify all identification reference finger templates submitted by the enrolling user are sufficiently unique and that none of the finger templates being submitted closely match those of any user under a different name. If no match is found, the enrollment may be considered complete with the user mode entered as "inactivate." Immediately following successful enrollment, the user may move to another workstation (not illustrated in FIG. 10) for authentication testing (AT 1050). Under the direction of the enrollment operator; the user may test each enrolled finger to confirm that he can readily reproduce a satisfactory image for authentication with the user's device (which may differ from the device used fox enrollment). Once the enrolling user passes AT 1050, a user may be requested to complete an optional short web-based feedback form on his enrollment experience using UFAR 1080 and the enrollment process may be complete.

Turning now to discuss the enrollment process in mote detail, the first stage of enrollment OPS 1030, may consist of several steps. To familiarize the enrolling user, a short orientation video may be shown that describes the enrollment and authentication procedures. Next, the enrolling user may practice generating images with different fingers on different imaging devices to familiarize himself with the hand/eye coordination and visual feedback of the enrollment interface on enrollment station 1020 or a separate kiosk. This practice may serve to facilitate high-quality, expedited enrollment, with the goal of reducing and possibly eliminating enrollment failures due to improper image generation.

A second purpose for this practice may be to create a report that maps the user's practice scores to their associated fingers and device names. Each practice score, referred to as an Image Quality Index (IQI), may be a measure of the grayscale image quality for the finger being scanned.

The IQI may be determined as a function of several factors derived from a captured image of the biometric identifier, such as a scanned fingerprint image, recorded voice pattern, a DNA analysis result, or any other biometric identifier image. These factors may be dependent or independent of the type of imaging device used. Examples of device independent factors of a visual image may include a gray scale level quality index, an area quality index, and a skeleton quality index. The gray scale level quality index of a fingerprint may be a measure of the image contrast with respect to how uniformly the fingerprint image is contrasted against its background. The area quality index may be a measure of the wetness/dryness of the fingerprint image, and may also be a determinant for requiring a new image if the print is too wet or too dry. The skeleton quality index may be a quality measurement of the extracted skeleton image, which in turn may be used to assess the quality of fingerprint minutiae in a sample image. Tools to quantify these factors are well known in the art.

An example of a device dependent factor may include a filter repair index. The filter repair index may be a percentage measurement of how effectively the filter for each different model of fingerprint imaging device would be able to recover the image.

These factors and/or other derived factors as are known in the art may be combined, e.,g., in a differentially weighted manner to obtain the IQI. In some embodiments, the IQI may be normalized to a standard scale, to ensure that the IQI is device independent. One exemplary combination, employed herein, is described in a U.S. Patent application entitled "Interoperability of Scanner Source for Purposes of Automatic Biometric Fingerprint Comparison" and assigned to 123ID. For this exemplary combination, the overall IQI is normalized to the success of the associated matching system and is imaging-device-independent. The resulting IQI score may be given as a percentage scale with 100% as the optimum quality score corresponding to an ideally successful match.

Because the IQI score may be imaging-device-independent, a user may log in using any device that produces a comparable grayscale image, including new devices that were not present during enrollment, as long as the resulting image quality meets a minimum required standard. Requiring an enrolling user to image each finger across multiple devices may allow the enrollment operator to select the best performing device to scan each finger individually for enrollment purposes.

The best performing device for each finger may be selected using one of two methods. For the first method, a single imaging device may be selected to generate the identification reference images for all fingers. For each device present in enrollment, the enrolling user may generate an image for some or all ten fingers. The average of the IQI scores of these images may then be computed. The user may then enroll with the imaging device producing the highest average IQI score. For the second method, the user may enroll each finger with the imaging device that produced the highest IQI score respectively for that finger. In both cases, the IQI scores of the images generated by the device selected for enrollment may be compared against one or more threshold IQI scores to assure that the images exceed a minimum quality level.

This innovative optimization feature of EAMS enrollment may provide the highest possible quality identification reference grayscale images and corresponding derived templates for subsequent storage in the UIDB thereby enhancing the confidence level for template matching during authentication.

An exemplary IQI Score Report for some demonstrative embodiments of the invention is shown in Table 1. The exemplary report, stored and displayed on enrollment station 1020, shows scores being reported for user Ajones, tested on Sep. 1, 2004, on all ten fingers. The column headings may correspond to imaging devices from several manufacturers: STMicroelectronics (SM), CrossMatch (CM), Digital Persona (DP), and AuthenTec (AU). The highest IQI scores may represent the highest image quality and may be analyzed by finger or device. For example, for user Ajones the STMicroelectronics device produced the highest average score, 89.7, and may be the overall imager of choice for Ajones. However, on an individual finger basis, the left and tight middle fingers produced higher quality images on the CrossMatch device. Therefore, for enrollment, the enrollment operator may recommend using the STMicroelectronics device for all fingers. As an alternative, he may also choose to enroll the user with the CrossMatch device for the left and tight middle fingers. For any device, the enrollment operator may check that the IQI score is above a threshold score for that device prior to selecting that device for enrolling any or all of the fingers.

TABLE 1

IQI Score Report Ajones 9/1/2004

|  | ST | CM | DP | AU |
|---|---|---|---|---|
| L-Thumb | 98 | 96 | 94 | 92 |
| L-Index | 89 | 87 | 79 | 81 |
| L-Middle | 79 | 82 | 78 | 71 |
| L-Ring | 94 | 90 | 82 | 78 |
| L-Pinky | 89 | 86 | 76 | 79 |
| R-Thumb | 97 | 95 | 93 | 91 |
| R-Index | 90 | 86 | 77 | 83 |
| R-Middle | 78 | 82 | 79 | 70 |
| R-Ring | 95 | 89 | 81 | 77 |
| R-Pinky | 88 | 85 | 75 | 78 |
| Average | 89.7 | 87.8 | 81.4 | 80 |

In some embodiments, the OPS functions may run locally on a Microsoft Windows based ox other operating system based workstation and may not require a network connection or authentication Furthermore, in some of these embodiments, components may be written to enhance compatibility with the Windows environment, e.g., either as ActiveX controls, Win32, or Win64 executables. Other embodiments may run on different operating systems, such as LINUX, if imaging device drivers for those operating systems are available.

After the user completes the OPS and produces an IQI score report, the user may be ready for the second stage, AFE 1040. The enrollment operator may run the AFE 1040 on enrollment workstation 1020 using a modified version of the ERRIFIC client module. The enrolling user may scan each individual finger on the imaging device selected during OPS 1030 for each finger respectively to create a complete set of identification reference images. Identification reference templates may be extracted from the identification reference images on workstation 1020 and may be submitted to AFICS/AFIMS 1041. AFICS/AFIMS 1041 may then run a real-time alias checking module 1045 to verify all identification reference templates derived from the enrolling user ale substantially unique and that none of the fingerprint templates being submitted match any existing user in UIDB 1060 under a different name. Because all user templates are suggested to be stored permanently, the EAMS may be able to assure that there will be no false impersonation of new users.

Depending on the results, the enrollment process may proceed along one of two paths (decision point 1045). If the alias checking module finds a template in UIDB 1060 that resembles one of the enrolling user's identification reference templates according to a predetermined set of criteria, that template may be flagged and the enrolling user may be designated as a potential alias (PA). In a separate offline process, a verification operator may use an ARM 1070 which may access UIDB 1060 via a DBA module 1071 to compare the enrolling user's information with that in UIDB 1060. In some embodiments, the ARM 1070 module may present a side-by-side comparison of the new and existing user data that may include, but is not limited to name, photographs, bit mapped grayscale fingerprint images, user demographics, and enrollment operator's UserID. If the verification operator determines that the potential alias is not an attempt to impersonate another user or is allowable as a known alias (KA), he may remove the potential alias designation and alert the enrollment operator that he may resume authentication testing 1050 and or AFE 1040. If the verification operator 1071 can't clearly establish the validity of the enrolling user's templates, he may stop the enrollment process and forward it to the appropriate authorities in the enterprise for further investigation (process 1075).

If the alias checking module does not find a match as a result of decision point 1045, the identity may be considered unique and the user may now be ready for the third stage, authentication testing (step 1050). Managed by the enrollment operator, authentication testing 1050 may verify that the set of templates generated during enrollment is of sufficient quality to assure proper matching during user authentication. The enrolling user may be prompted by the web-based authentication software to test each enrolled finger. The generated templates may be sent to the AFICS/AFIMS 1041 application for matching in the UIDB 1060 (this step is not illustrated in FIG. 10). The EAMS may allow a preset configurable maximum number of failures per finger before considering the authentication test as having failed. The outcome of this testing process (decision point 1055) may result in either a successfully completed enrollment or a recycling back to the AFE 1040. Any authentication test failures may trigger an administrative alert indicating there was a problem with the user's authentication test. The user's UserID may then be designated as having incomplete enrollment in UIDB 1060, and the enrollment operator may attempt to re-enroll any problem fingers and or may assist in authentication testing as soon as possible.

In some embodiments, an enrolling user who has successfully completed authentication testing on at least one finger may then be requested to provide user feedback (UFAR 1080) on the new EAMS user's enrollment experience. This feedback may provide the enterprise and EAMS operator with greater understanding of how well the EAMS is being received and may be a useful tool for subsequent biometric authentication deployment and/or planning.

Figure 11:
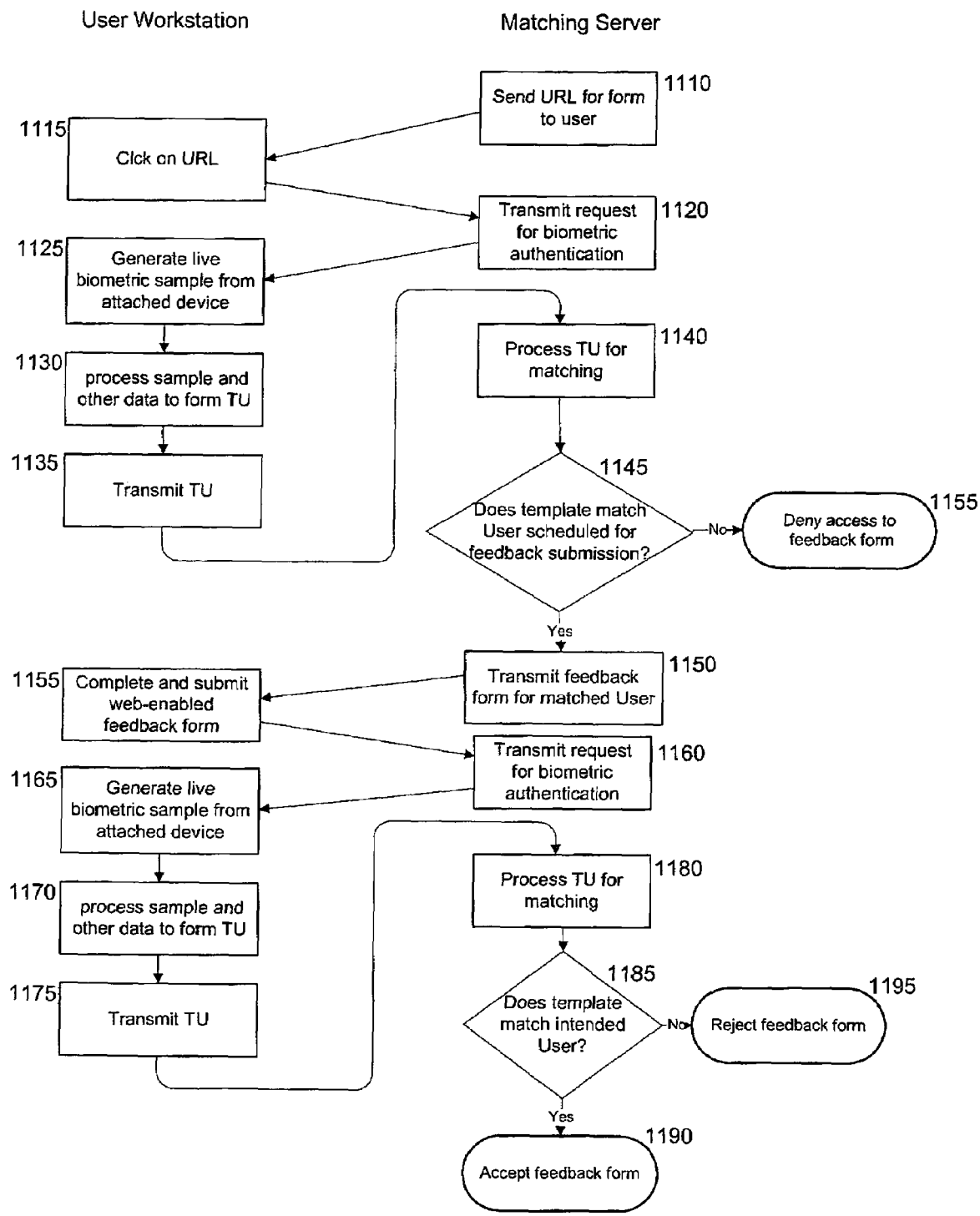
FIG. 11 is a schematic flowchart of the process for providing user feedback with biometric authentication according to some demonstrative embodiments of the invention.

FIG. 11 is a schematic flowchart of the process for providing UFAR 980. For an exemplary embodiment, a servlet that generates the form, written in J2EE for broad compatibility on a variety of platforms, may be accessed by the user through a static or dynamic URL. This form and the URL may be uniquely associated with the enrolling user The servlet for this URL may be located on the matching server or separately on an application server. Even if another active user attempts to submit the form, the EAMS may not accept it The user may receive the URL via email, although other delivery methods are possible (step 1110). In addition, the URL may also be time-sensitive such that, if the user attempts to access the URL after a configurable expiration date, he may be prevented from completing the form.

In response to the user clicking on the URL (step 1115), the matching server may transmit a request to the user for biometric authentication (step 1120) Steps 1125-1140 summarize an exemplary process from generating a fingerprint (biometric) sample image to processing the resulting template for matching against the UIDB, and were also described above in the discussion of the method for secure transmission of a transport unit. At Step 1145, the matching server may determine whether the submitted template matches the user scheduled for feedback submission. If the template doesn't match, access to the feedback form may be denied (step 1155). In some embodiments, steps 1120 to 1145 may be repeated to allow the user one or more additional opportunities to provide feedback. If the template does match, the server may assemble and transmit a web-enabled feedback form to the user (step 1150). Although not shown, the server may also deny access to the feedback form if the URL is time-sensitive and has expired The user may then complete and submit the form back to the server (step 1155) which, in turn, may request a second biometric authentication (step 1160). Steps 1165-1180 may proceed identically to steps 1125-1140 for processing the newly submitted fingerprint sample. At step 1185, the matching server again may confirm that the user is the intended recipient of the feedback form, and may accept the form for a positive match (step 1190), and may reject the form for a negative match (step 1195). As above, in some embodiments, steps 1160-1185 may be repeated.

Upon submission of the form, feedback table 1062 of UIDB 1060 may be updated to reflect the feedback data submitted by the user. In an exemplary embodiment, follow-up feedback on a periodic basis may also be offered via the same J2EE servlet or similar functional module with a configurable batch process to email URL's when a stored, elapsed timer value corresponding to the period between feedback sessions has been met.

An innovative aspect of UFAR 1080 is the requirement for the user's fingerprint to authenticate the submitted form. Biometric authentication, a web-based form, and SSL transmission of the form may assure that the feedback may be incontrovertibly linked to the user and may not be compromised. Requesting biometric authentication twice, once at the beginning and once at the end, may assure that only the designated user may be able to receive the feedback form and submit it. Not even another active user can submit the completed form on the user's behalf. An enterprise may also require biometric authentication on feedback across a wide variety of situations, thereby assuring reliable user-experience data for a decision-making process A real-time reporting engine which, in an exemplary embodiment, may also be written in J2EE, may utilize a standard Web-based graphical user interface and may provide ready access to reports via fingerprint authentication Such reports may be viewed via an SSL link or other secure transmission form in a printer friendly format or may be emailed.

In addition to providing the authentication system software and support provider and enterprise customer with a tool for tracking applicant and user licenses, the EAMS architecture may include a means fox secure management of those licenses.

Files for the two license types incorporated in the EAMS, user and application, may initially be generated by a unique license generating system. In an exemplary embodiment, these files may be in Extensible Markup Language (.xml) file format for compatibility with web-based application servers, although other formats as are known in the art may be used. The license generator may be housed in a secure location to avoid duplication or tampering It may be accessed by a graphical user interface, a command line interface, application program interface, or other such interface without departing from the spirit of the invention.

Figure 12:
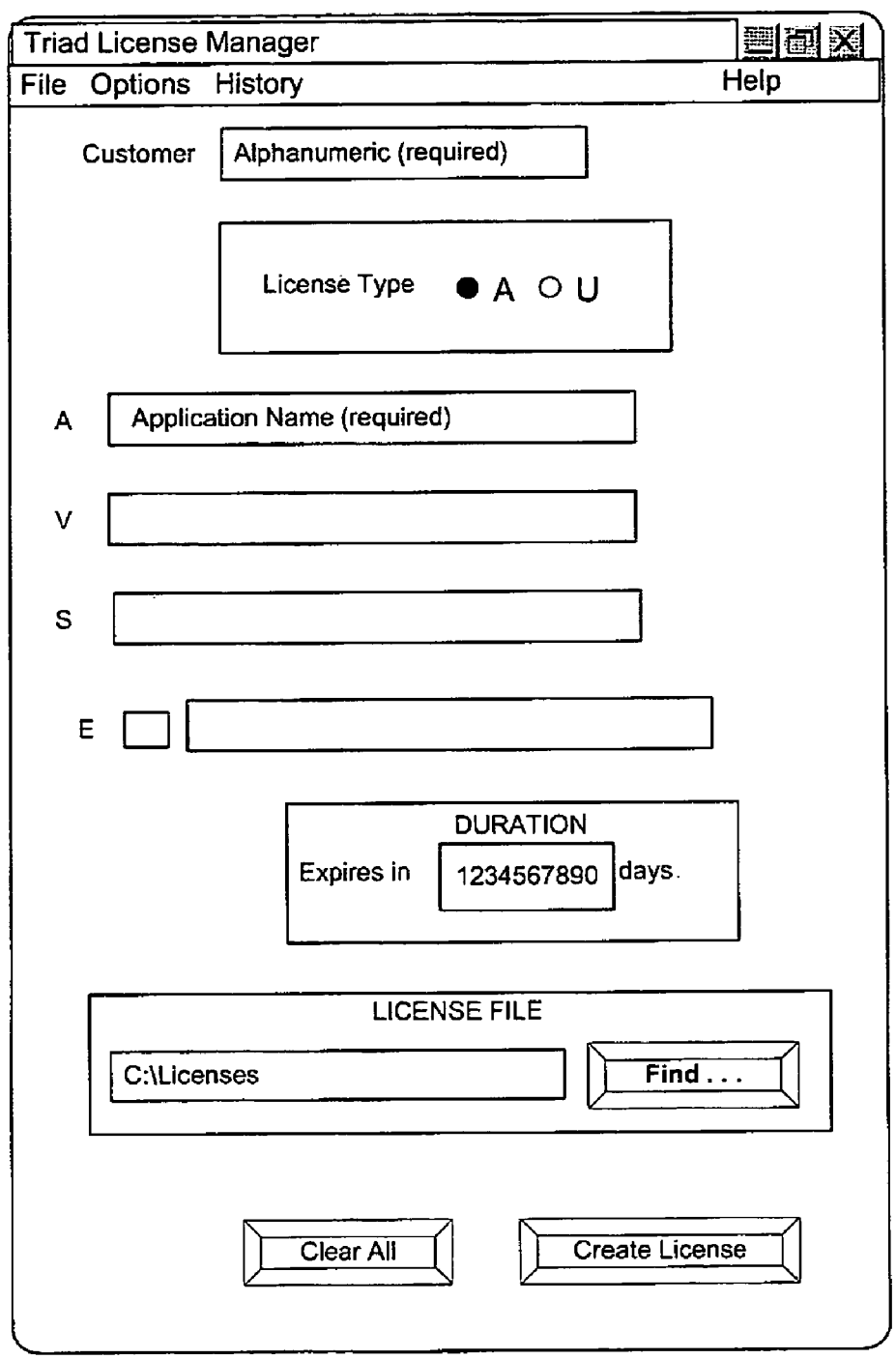
FIG. 12 is a schematic illustration of a GUI screen for an application license generator according to some demonstrative embodiments of the invention.
Figure 13:
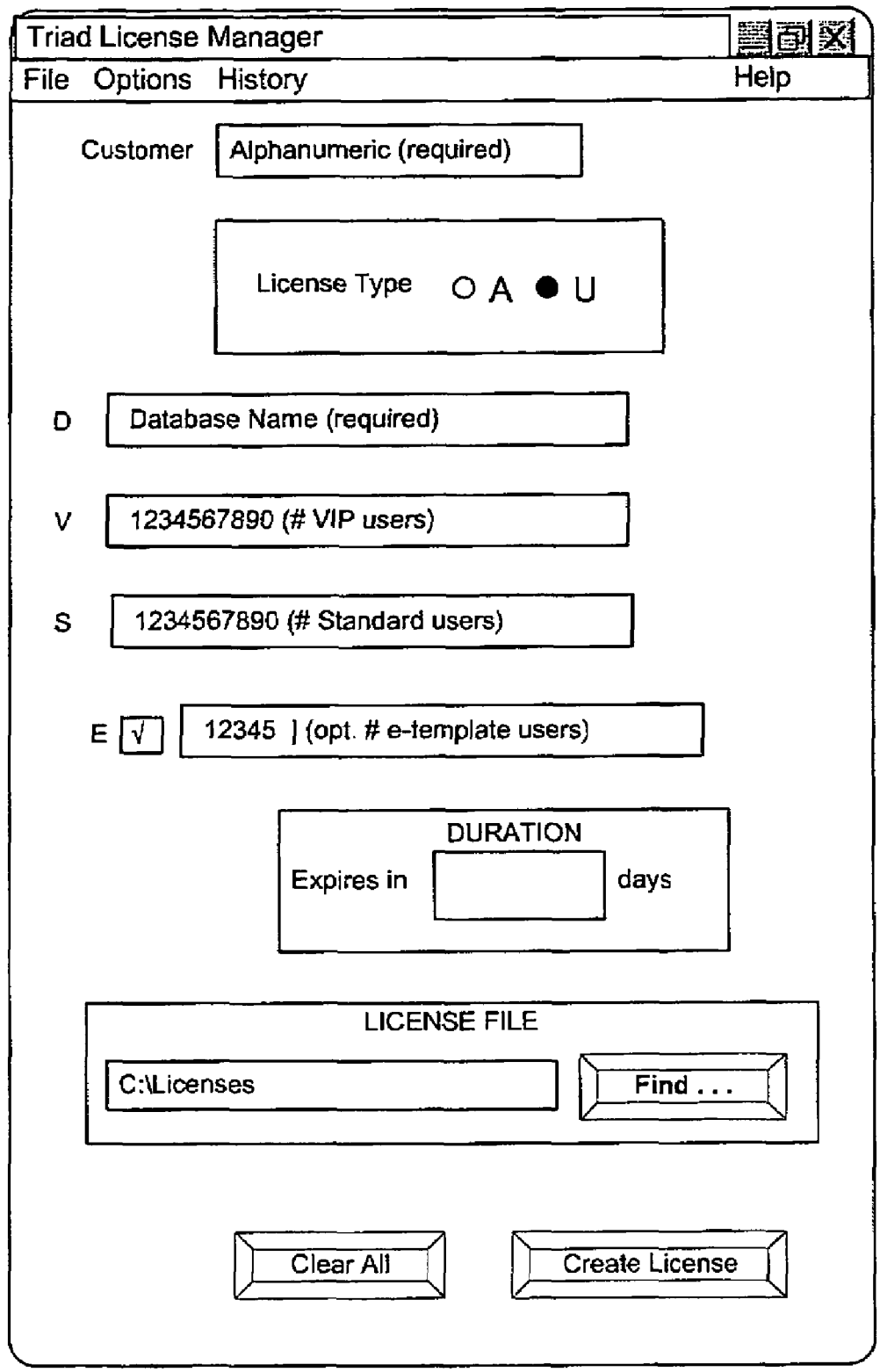
FIG. 13 is a schematic illustration of a GUI screen for a user license generator according to some demonstrative embodiments of the invention.

FIGS. 12 and 13 are schematic illustrations of graphical user interfaces for an application license and a user license generator respectively. In some embodiments, both interfaces may contain indicators of which license type is being accessed, customer name, and file directory/name. The application license graphical user interface illustrated in FIG. 12 may include fields for application license duration, the name of the application being licensed, and command buttons to create additional licenses or clear (delete) input fields. In some embodiments of the present invention, the contents of these fields may be included in the application license file. Similarly, the user license graphical user interface illustrated in FIG. 13 may include fields for the UIDB (database) name, the number of VIP users, the number of standard users, and optionally the number of e-template users.

When an enterprise customer submits a request to the EAMS software and support provider to add a new application license, or update an existing application license, the license generator may be accessed to create the new license file, encrypt it, and transmit it to the appropriate enterprise application manager who may install it. If a new user license is required, the license file may be sent to the customer for installation into their corresponding UIDB. OEM partners and other EAMS software and support providers may be granted remote access to the license generator by VPN or other secure communications channel. Copies of license files generated by remote access for OEM partners and other. EAMS software and support providers to generate licenses may be maintained at the original location for accounting purposes.

Figure 14:
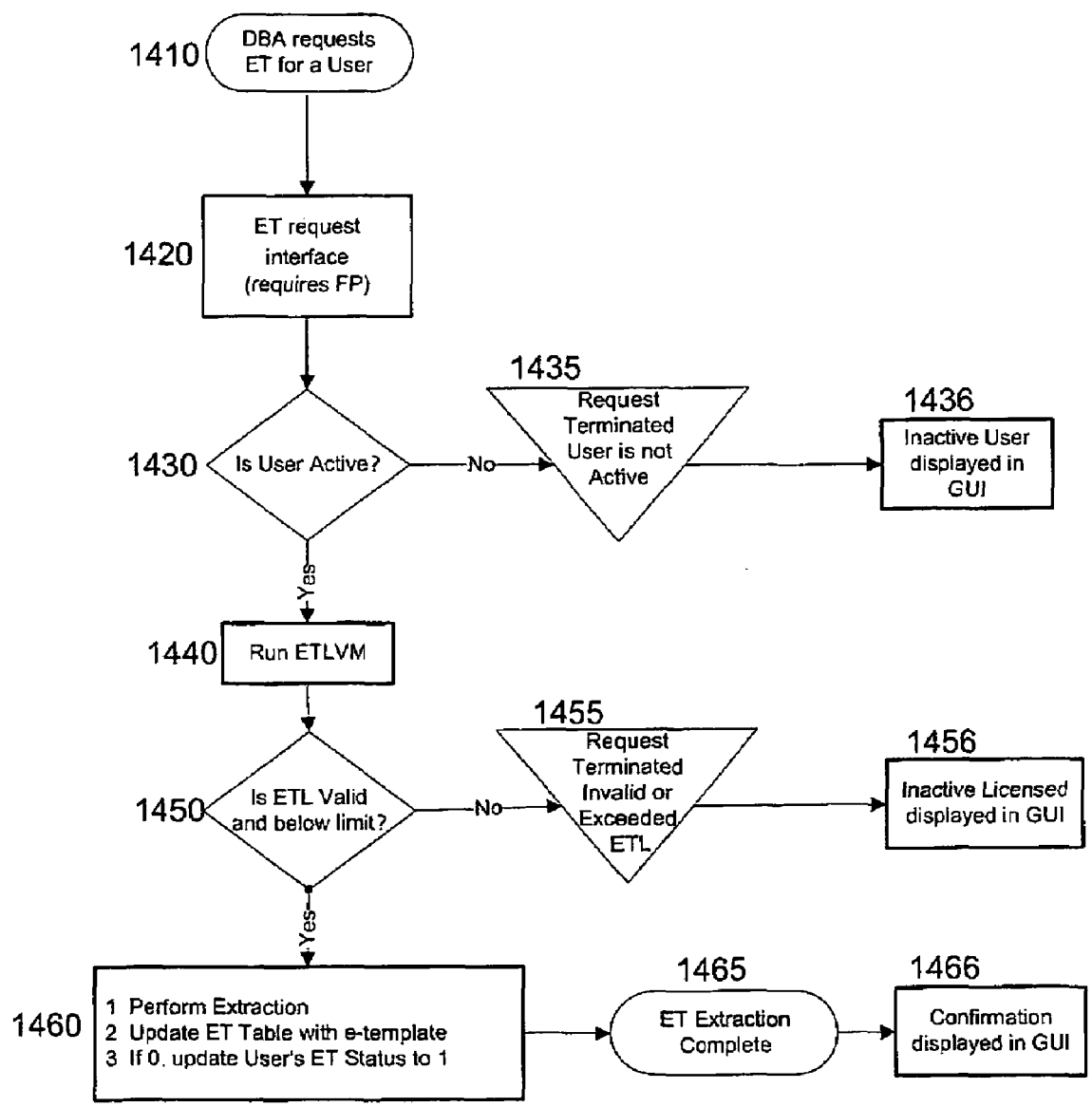
FIG. 14 is a schematic flowchart of a process for generating a new e-template according to some demonstrative embodiments of the invention.

FIG. 14 is a schematic flowchart of the process for generating a new e-template and validation of the e-template license according to some demonstrative embodiments of the invention. A database administrator (DBA) may begin the process by requesting an e-template (ET) for a user (step 1410) using an administrative workstations Local EAMS software on the administrative workstation may display an e-template request interface that may indicate that a fingerprint (FP) authentication is requited (step 1420). Next, the UIDB may be queried to confirm that the user is active (step 1430). If the user is not active, the request may be terminated in step 1435. In some embodiments, an alert message conveying this information may be sent to the DBA (step 1436). If the user is active, the e-template license verification method (ETLVM) may be called in step 1440. This module may verify that the customer, has a valid e-template license (ETL) and that the maximum number of users has not been exceeded (step 1450). If the ETL is not valid or exceeded, the request may be terminated (step 1455), and a message conveying the terminated request and reason may be displayed on the DBA's workstation (step 1456). If the ETL is valid and the number of users has not been exceeded, the e-template may be derived in step 1460. First the ET may be extracted from the user's AFIT on a selected finger. This ET may then be stored in a table in the UIDB. Lastly, the user's ET status in the UIDB may, in some embodiments, may be set to one. At this point the extraction may be complete (step 1465), and a message confirming the completed process may be sent to the DBA's workstation (step 1466). Different methods of communicating a completed process to the DBA or other personnel may also be employed. In some embodiments, the ET may be exported to another system unrelated to the EAMS for usage in that system.

Figure 15:
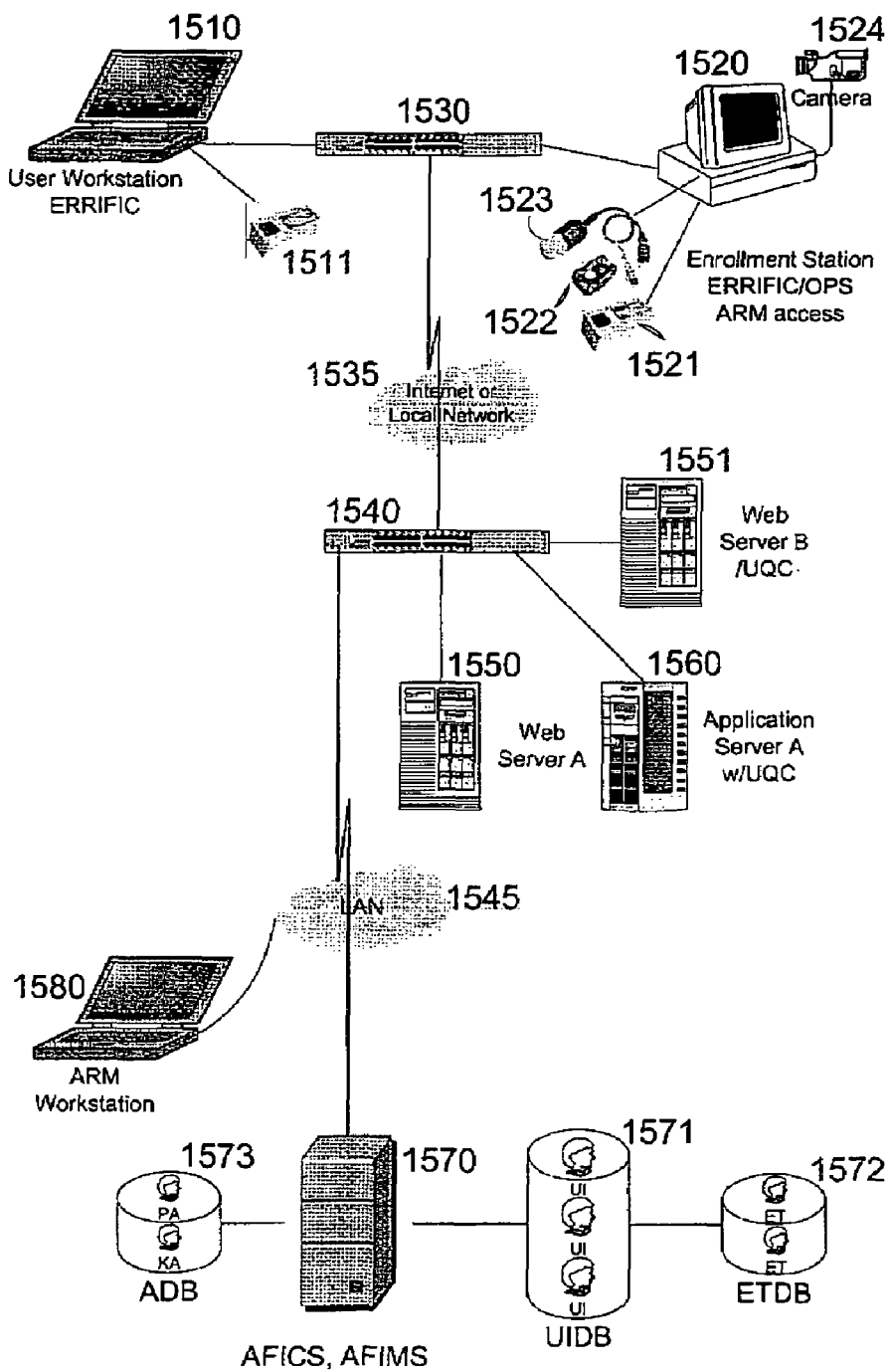
FIG. 15 is a schematic illustration of an exemplary small scale or pilot deployment of the enterprise authentication and migration system according to some demonstrative embodiments of the invention.
Figure 16:
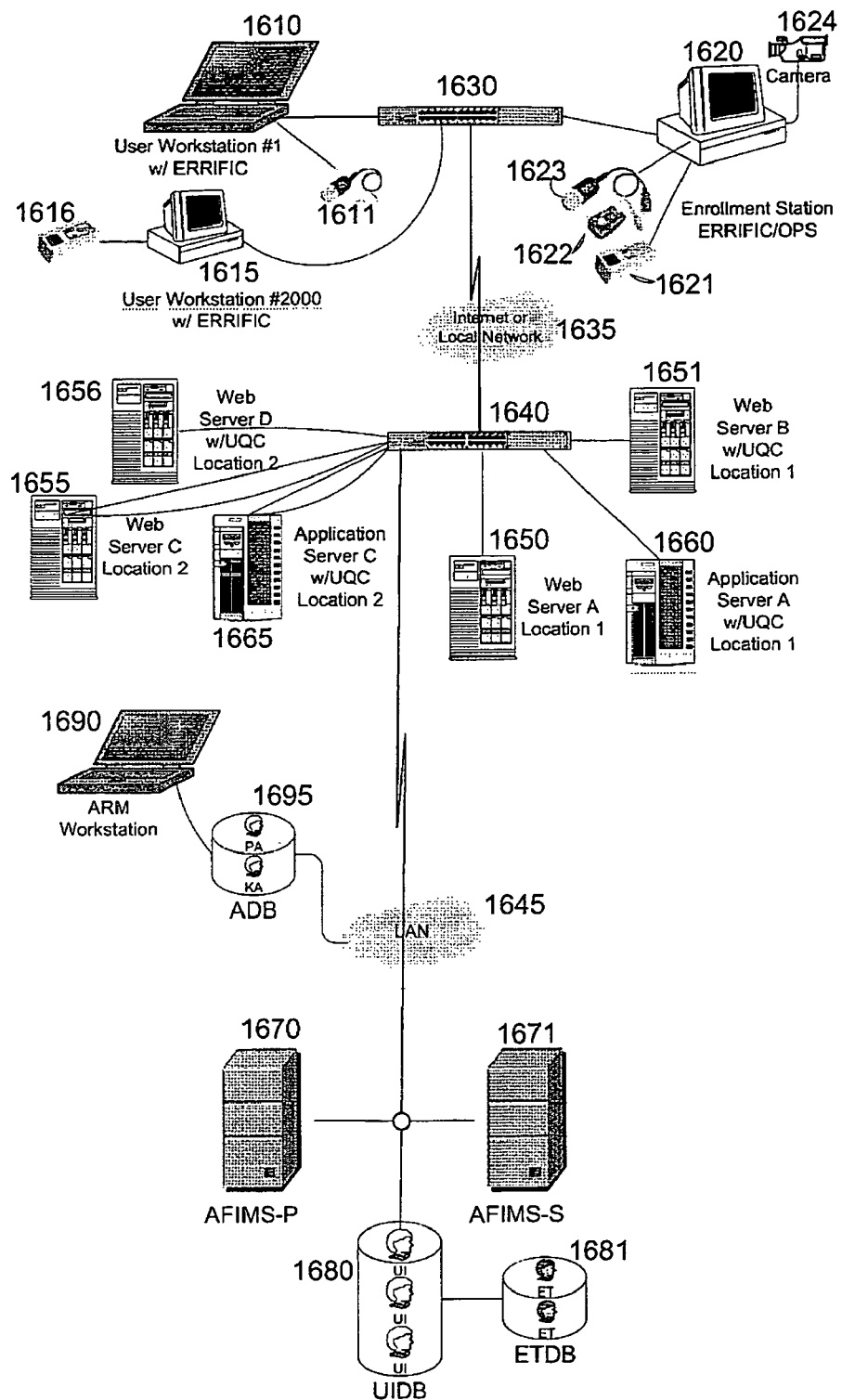
FIG. 16 is a schematic illustration of an exemplary medium scale deployment of the enterprise authentication and migration system according to some demonstrative embodiments of the invention.
Figure 17:
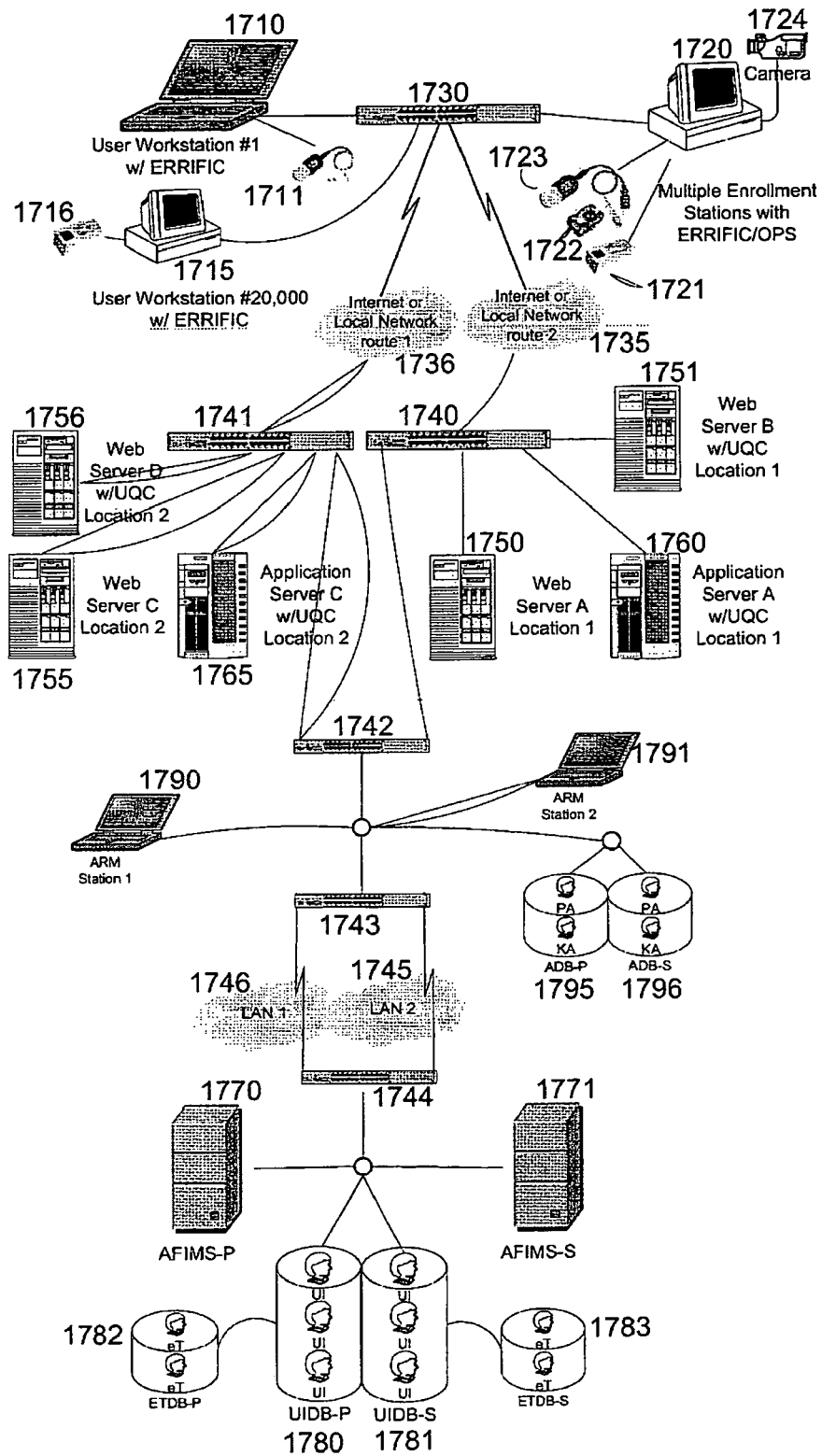
FIG. 17 is a schematic illustration of a large scale deployment of the enterprise authentication and migration system according to some demonstrative embodiments of the invention.

In some embodiments of a full-scale implementation of the EAMS, the distribution of its functional elements may vary from that described in FIG. 2. To highlight how these variations may be implemented, FIGS. 15-17 provide schematic illustrations of exemplary EAMS deployment configurations in small, medium and larger scale enterprise systems.

Initial deployment of the EAMS for an enterprise may encompass no more than 200 users and five applications. The same functional components in FIGS. 1 and 2 may be present; however, some may be distributed on different network elements in alternative embodiments. FIG. 15 illustrates the layout for an exemplary pilot or small scale deployment in an enterprise. The small deployment equipment may include: a user workstation 1510 with an associated fingerprint imager 1511; an enrollment station 1520 with fingerprint imagers 1521-1523 and a camera 1524; routers 1530 and 1540 linked by a network 1535 and further connected to a LAN 1545; web servers 1550 and 1551; an application server 1560; a matching server 1570 connected to a UIDB 1571, an e-template database ETDB) 1572, and an alias database (ADB) 1573; and an alias resolution manager (ARM) workstation 1580.

An enterprise user at workstation 1510 may log into an EAMS enabled application using a commercially available fingerprint imager 1511, which for this exemplary embodiment is shown here as a CrossMatch V300. The workstation 1510 may be loaded with the ERRIFIC module to handle all EAMS image capture, processing, and communications functions. Workstation 1510 may connect to the enterprise network through router 1530 which, in turn, may connect to a hub and/or switch to support other such users in an enterprise office environment. This connection and others in the following figures ate illustrative of many possible network topologies, including those required for remote access user's. Other network topologies may be employed without departing from the scope of the present invention.

The local office environment may also include an enrollment workstation 1520, loaded with both ERRIFIC and OPS modules to accommodate all of the local enrollment activities. Enrollment station 1520 may have network access to ARM software for alias resolution functions during and or after the enrollment process. For proper security, the enrollment workstation 1520 may be located at an in-house, trusted environment. This embodiment of the EAMS enrollment system may support scanners such as those presently available from Secugen, Digital Persona, AuthenTec, CrossMatch, and STMicroelectronics; although other embodiments may support other fingerprint imagers FIG. 15 also depicts an illustrative set of these fingerprint imagers 1521-1523, along with camera 1524 for taking digital photographs of users during the enrollment process. All EAMS software elements loaded on workstation 1510 and enrollment station 1520 may be classified as Tier 1, and, for the embodiments described herein, may run on any Windows 2000, XP, or 2003 operating system with Internet Explorer version 6 or later and ActiveX enabled.

Network 1535 may provide the connection to the servers and databases at the enterprise data center. This link may be over the Internet for remotely located offices or by a local area network for an office collocated with the enterprise data center. Furthermore, the physical connection may be by terrestrial fiber; cable, wireless, and or satellite link.

Router 1540 may direct traffic entering the enterprise data center and passing between the different Tier 2 (application level) servers and workstations of the data center. The embodiment of FIG. 15 depicts servers for two applications that may utilize the EAMS authentication. Either web server 1550 or 1551 may include a Java Virtual Machine for running the EAMS Start application. Web server 1550 may work in conjunction with application server 1560 for interactions with application A. The EAMS software and authentication may correspond to that described above with respect to FIG. 2. Web server 1551 may include the application server for application B collocated on the same hardware platform along with the UQC module. Authentication for application B may proceed in the same manner as described earlier; however, the application may be consolidated into one web/application server. The application server technology may be the same for both A and B with applications built on platforms such as WebSphere, WebLogic, TOMCAT, JRun, or JBoss.

LAN 1545 may connect these servers with resources at the data center and ARM workstation 1580. In some embodiments, workstation 1580 may be a dedicated workstation for alias resolution that may be located on the enterprise side to be isolated from the enrollment process. Furthermore, in some embodiments LAN 1545 may be firewall protected to isolate data center hardware from outside attack. For a small deployment, collection and alias resolution level applications (Tier 3) and matching/database access applications (Tier 4) functions may be combined on a single server. Server. 1570 may host the EAMS AFICS and AFIMS applications that manage the database queries and biometric matching. In addition to UIDB 1571, the EAMS applications also may have access to separate databases for e-templates, ETDB 1572, and aliases, ADB 1573. Separating ADB 1573 from UIDB 1571 may improve overall system security by isolating access to ADB 1573 from the entire UIDB 1571. ADB 1573 may be a standalone alias database which may be replicated with native functions in the database management system and may be accessible by workstation 1580. For this and some other embodiments, server 1570 may run Windows 2000 or 2003 server with MS-SQL or similar relational database technology for database elements 1571-1573.

FIG. 16 is a schematic illustration of the hardware configuration for an exemplary medium size enterprise deployment of the EAMS which may have a capacity of up to 2,000 users and 20 applications. The hardware elements of this deployment may include: user workstations 1610 and 1615 with associated fingerprint imagers 1611 and 1616; an enrollment station 1620 with fingerprint image is 1621-1623 and a camera 1624; routers 1630 and 1640 linked by a network 1635 and further connected to a LAN 1645; web servers 1650, 1651, 1655, and 1656; application servers 1660 and 1665; matching servers 1670 and 1671 connected to a UIDB 1680 and an e-template database (ETDB) 1681; and an ARM workstation 1690 connected to an ADB 1695.

The differences in the architecture between FIGS. 15 and 16 may reflect the greater distribution of functional elements necessary to accommodate the higher traffic load from more users and applications. The expansion of elements also may provide a greater level of redundancy, fault tolerance, and failover. The depiction of the local office connected to router 1630 has an additional user workstation 1615 and associated fingerprint imager 1616, numbered as workstation #2000, to reflect the larger user pool that may be present in some embodiments of the invention. In this exemplary deployment there may also be a second set of web and application servers depicted in FIG. 16 as at a separate customer data location, but also connected to the enterprise network through router 1640. Web servers 1650 and 1651 and application server 1660 may be functionally equivalent to their counterparts in FIG. 15 and to web servers 1655 and 1656 and application server 1665 depicted as being in location 2 in FIG. 16.

The most significant differences between the small and medium scale deployment may relate to database access and matching server scaling. In particular, Tier 3 administration and alias resolution applications may operate separately from the Tier 4 collection, matching, and database level components. Instead of on a single server 1570, the AFICS/AFIMS may run on two separate servers 1670 and 1671 to accommodate the higher load and to provide additional fault tolerance and failover. Server 1670 may be the primary matching server; while Server 1671 may be the secondary matching server Depending on the enterprise customer's preferences, the two may operate in parallel for load balancing or the secondary may operate in standby until needed as a backup for the primary server (failover). Furthermore, ARM workstation 1690 may connect to ADB 1695 which, in turn, may be connected to LAN 1645. The connection may allow the alias checking to be conducted in a highly secure manner as described earlier FIG. 17 is a schematic illustration of the layout for a large enterprise customer who may have multiple locations, up to 20,000 users, and 20+ applications. Networking and EAMS functions may now be performed along multiple paths because of the large customer's demands. In addition, the design may include higher levels of redundancy to eliminate single points of failure for connections among mission critical databases, network paths, and applications Coding the UQC 251 software in Java or other highly portable programming environment may become more valuable as the number of application servers increases. In some embodiments, servers now may be any of the Windows family or Solaris or other operating system, while the database management system may be DB2, Sybase, Oracle, MS-SQL or a combination of these.

The elements for the embodiment of FIG. 17 may include: user workstations 1710 and 1715 with associated fingerprint imagers 1711 and 1716; an enrollment station 1720 with fingerprint imagers 1721-1723 and a camera 1724; routers 1730 and 1740-1744 linking networks 1735, 1736, 1745, and 1746; web servers 1750, 1751, 1755, and 1756; application servers 1760 and 1765; collection and matching servers 1770 and 1771 connected to a UIDB 1780, a UIDB 1781 and e-template databases (ETDB) 1782 and 1783; and ARM workstations 1790 and 1791 connected to an ADB 1795 and an ADB 1796.

Tier 1 end user and enrollment applications may have the same configuration as that depicted in FIG. 16, with additional users and multiple enrollment stations 1720 not depicted connected directly or indirectly to router 1730. Because of the larger enterprise's diverse locations, requests to access applications may take different paths to multiple data centers housing the appropriate web and application servers. Networks 1735 and 1736 exemplify this diversity; and like network 1635, may be either wide area networks or local area networks. The application level server configuration for a large deployment may also be similar to that for a medium deployment reflecting touting to the appropriate servers via routers 1740 and 1741 at two exemplary locations The Tier 3 elements may be further expanded for a large deployment. In the embodiment of FIG. 17, multiple ARM workstations, depicted as workstations 1790 and 1791, may have direct access to primary ADB 1795. However, a secondary ADB 1.796 may operate either in parallel for load balance or as backup to enhance reliability (fault tolerance/failover).

Similarly, the UIDB 1780 and ETDB 1782 may have secondary UIDB 1781 and ETDB 1783 as their respective mirrors/backups. As with the ADB 1796, UIDB 1781 may be synchronized to UIDB 1780 and may operate as a mirror with real-time or batch updating depending on an enterprise customer's preferences.

It wilt be understood that the above descriptions of some embodiments are given by way of example only and that various other modifications may be made by those skilled in the art without departing from the split and scope of the invention.

What is claimed is:

1. A method of authenticating the identity of an enrolled user of a biometric authentication and/or identification system having a set of user modes including an exception mode, the method comprising:

receiving a request from the enrolled user for switching a user mode of the enrolled user to the exception mode;
requesting identifying information from the enrolled user;
receiving the identifying information from the enrolled user;
verifying the enrolled user's identity by determining if the identifying information received from the enrolled user matches identifying information of the enrolled user as stored in a user information database;
submitting to a template matching server a biometric template extracted from a biometric sample image of a biometric identifier of a person authorizing a switch in the enrolled user's user mode to the exception mode;
if the template matching server finds a match between the biometric template of the person authorizing the switch in the enrolled user's user mode to the exception mode and a pre-stored reference biometric template of the person authorizing the switch in the enrolled user's user mode to the exception mode, switching the enrolled user's user mode to the exception mode;
assigning to the user a temporary password having an expiration date;
storing the temporary password and said expiration date in the user information database;
setting a user exception mode authentication counter value stored in the user information database to a value corresponding to a number of allowed authentications with the temporary password;
transmitting the temporary password to the enrolled user by an out-of-band communication;
receiving a request from the enrolled user for access to a network application that requires biometric authentication;
sending a request for a user identification string previously assigned uniquely to the enrolled user and stored in the user information database and the temporary password;
receiving a user identification string from the enrolled user and a password from the enrolled user;
if the received user identification string matches the user identification string previously assigned uniquely to the enrolled user, the received password matches the temporary password, the temporary password has not expired, and the user exception mode authentication counter is greater than zero, authenticating the identity of the enrolled user;
decrementing the user exception mode authentication counter; and
if the template matching server finds a match between a biometric template extracted from a biometric image of a biometric identifier of the enrolled user in exception mode and a reference biometric template of the enrolled user, switching the enrolled user's user mode.

2. The method of claim 1 further comprising repeating said receiving a request from the enrolled user for access to network, said sending a request for a user identification string, said receiving a user identification string, and said authenticating the identity of the enrolled user in the exception mode up to the number of times determined by the value of the user exception mode counter stored in the database when the enrolled user's user mode is first switched to exception mode.

3. The method of claim 1 wherein the out-of-band communication for transmitting the temporary password comprises an email transmission.

4. The method of claim 1 wherein the out-of-band communication for transmitting the temporary password comprises a facsimile transmission.

5. The method of claim 1 wherein the identifying information received from the enrolled user includes the enrolled user's answers to a series of questions regarding personal information about the enrolled user.

6. The method of claim 1 wherein the biometric identifier comprises a fingerprint.

7. A system for authenticating the identity of an enrolled user of a biometric authentication and/or identification system having a set of user modes including an exception mode, the system comprising:

one or more user information databases to store data records for all enrolled users, each data record including, but not limited to a uniquely assigned user identification string, a user mode indicator, a user exception mode authentication counter, reference biometric identifier templates for the enrolled user and a person authorizing a switch in a user mode of the enrolled user to the exception mode, information that identifies the enrolled user, and a temporary password having an expiration date and assigned exclusively to the enrolled user;

a client device, operatively associated with the user information database, to receive a request for switching the enrolled user's user mode to the exception mode sent from the enrolled user; to request identifying information from the enrolled user; to receive information sent by the enrolled user; if the information sent by the enrolled user matches the information that identifies the enrolled user stored in the user information database, to verify the enrolled user's identity; to submit to a template matching server, a biometric template extracted from a biometric sample image of a biometric identifier of the person authorizing the switch in the enrolled user's user mode to the exception mode; if the template matching server finds a match between the submitted biometric template and the reference biometric template of the person authorizing the switch in the enrolled user's authentication mode to the exception mode, to switch the enrolled user's user mode to the exception mode: to assign the temporary password to the user; to store the temporary password and the expiration date in the user information database; to set the user exception mode authentication counter value stored in the user information database to a value corresponding to the number of allowed authentications with the temporary password; and to transmit the temporary password to the first client device by the out-of band communication; and a server, operatively associated with the user information database, to receive a request from the enrolled user for access to a network application that requires biometric authentication; to receive, from the enrolled user, a user identification string and a password; if the received user identification string matches the user identification string previously assigned uniquely to the enrolled user, the received password matches the temporary password, the temporary password has not expired, and the user exception mode authentication counter is greater than zero, to authenticate the identity of the enrolled user; to decrement the user exception mode authentication counter by one; and to, if the template matching server finds a match between a biometric template extracted from a biometric image of a biometric identifier of the enrolled user in exception mode and a reference biometric template of the enrolled user, switch the enrolled user's user mode.

8. The system of claim 7 wherein the out-of band communications for transmitting the temporary password comprises an email transmission.

9. The system of claim 7 wherein the out-of-band communication for transmitting the temporary password comprises a facsimile transmission.

10. The system of claim 7 wherein the biometric identifier comprises a fingerprint.

* * * * *